US009451526B2

(12) United States Patent
Deenoo et al.

(10) Patent No.: US 9,451,526 B2
(45) Date of Patent: Sep. 20, 2016

(54) METHOD AND APPARATUS FOR DIRECTIONAL MESH INITIALIZATION

(71) Applicant: InterDigital Patent Holdings, Inc., Wilmington, DE (US)

(72) Inventors: Yugeswar Deenoo, King of Prussia, PA (US); Arnab Roy, East Norriton, PA (US); Ravikumar V. Pragada, Collegeville, PA (US); Onur Sahin, Brooklyn, NY (US); Philip J. Pietraski, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/766,051

(22) PCT Filed: Feb. 5, 2014

(86) PCT No.: PCT/US2014/014942
§ 371 (c)(1),
(2) Date: Aug. 5, 2015

(87) PCT Pub. No.: WO2014/124048
PCT Pub. Date: Aug. 14, 2014

(65) Prior Publication Data
US 2015/0373618 A1 Dec. 24, 2015

Related U.S. Application Data

(60) Provisional application No. 61/761,962, filed on Feb. 7, 2013, provisional application No. 61/874,512, filed on Sep. 6, 2013.

(51) Int. Cl.
*H04W 40/16* (2009.01)
*H04W 8/00* (2009.01)
(Continued)

(52) U.S. Cl.
CPC ............. *H04W 40/16* (2013.01); *H04W 8/005* (2013.01); *H04W 56/005* (2013.01);
(Continued)

(58) Field of Classification Search
CPC ........................... H04W 40/16; H04W 72/082
USPC ............ 455/452.1, 452.2, 63.1, 67.11, 67.13
See application file for complete search history.

(56) References Cited

U.S. PATENT DOCUMENTS 7,522,591 B2 * 4/2009 Kiyoto .................. H04L 67/322
370/389
8,214,475 B1 * 7/2012 Scofield .............. H04L 67/1053
709/217
(Continued)

FOREIGN PATENT DOCUMENTS

WO 2008/036756 3/2008
WO 2009/053477 4/2009

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specificatons, IEEE Std. 802.11-2012 (Mar. 29, 2012).

(Continued)

*Primary Examiner* — John J Lee
(74) *Attorney, Agent, or Firm* — Volpe and Koenig, P.C.

(57) ABSTRACT

A method and apparatus for association in a mesh network may be disclosed. A method in a new node may include performing a discovery procedure with a plurality of peer nodes in the mesh network, initiating a temporary association procedure with each peer node, selecting a set of peer nodes from the plurality of peer nodes based on a selection algorithm at least based on a signal-to-interference and noise ratio (SINR) with each peer node and an interference impact of each peer node, and performing a final association with the selected set of peer nodes.

20 Claims, 33 Drawing Sheets

(51) Int. Cl.
*H04W 56/00* (2009.01)
*H04W 72/08* (2009.01)
*H04W 84/22* (2009.01)
*H04L 12/24* (2006.01)
*H04W 40/12* (2009.01)
*H04W 84/18* (2009.01)

(52) U.S. Cl.
CPC ........... *H04W 72/082* (2013.01); *H04L 41/12* (2013.01); *H04W 40/12* (2013.01); *H04W 84/18* (2013.01); *H04W 84/22* (2013.01)

(56) References Cited

U.S. PATENT DOCUMENTS

| | | |
|---|---|---|
| 2005/0094585 A1 | 5/2005 | Golden et al. |
| 2008/0313698 A1* | 12/2008 | Zhao .................... H04L 63/08 726/1 |
| 2010/0265895 A1 | 10/2010 | Bracha |
| 2012/0087281 A1 | 4/2012 | Rahman et al. |
| 2015/0249921 A1* | 9/2015 | Lv .................... H04L 63/0884 726/4 |

* cited by examiner

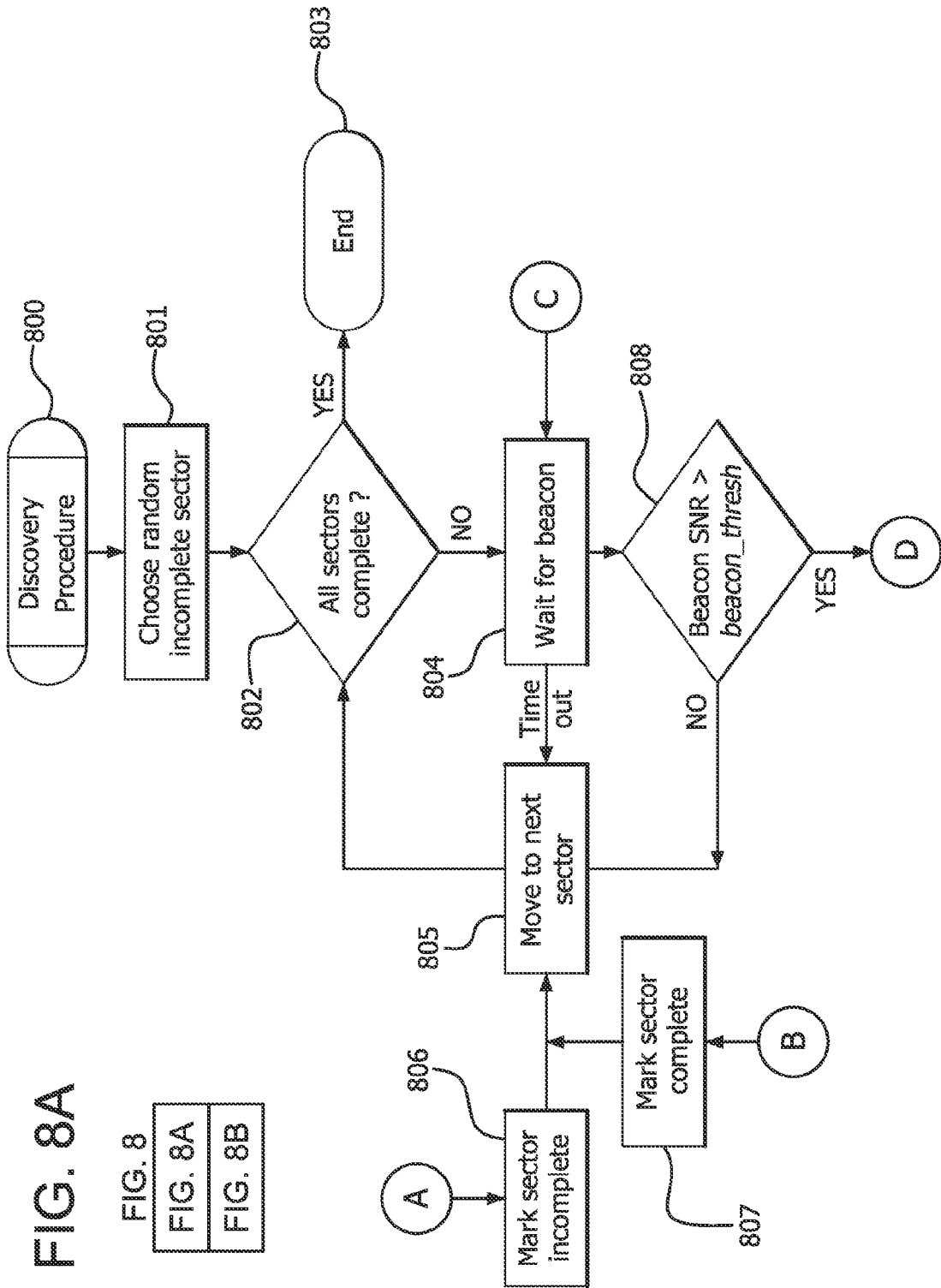

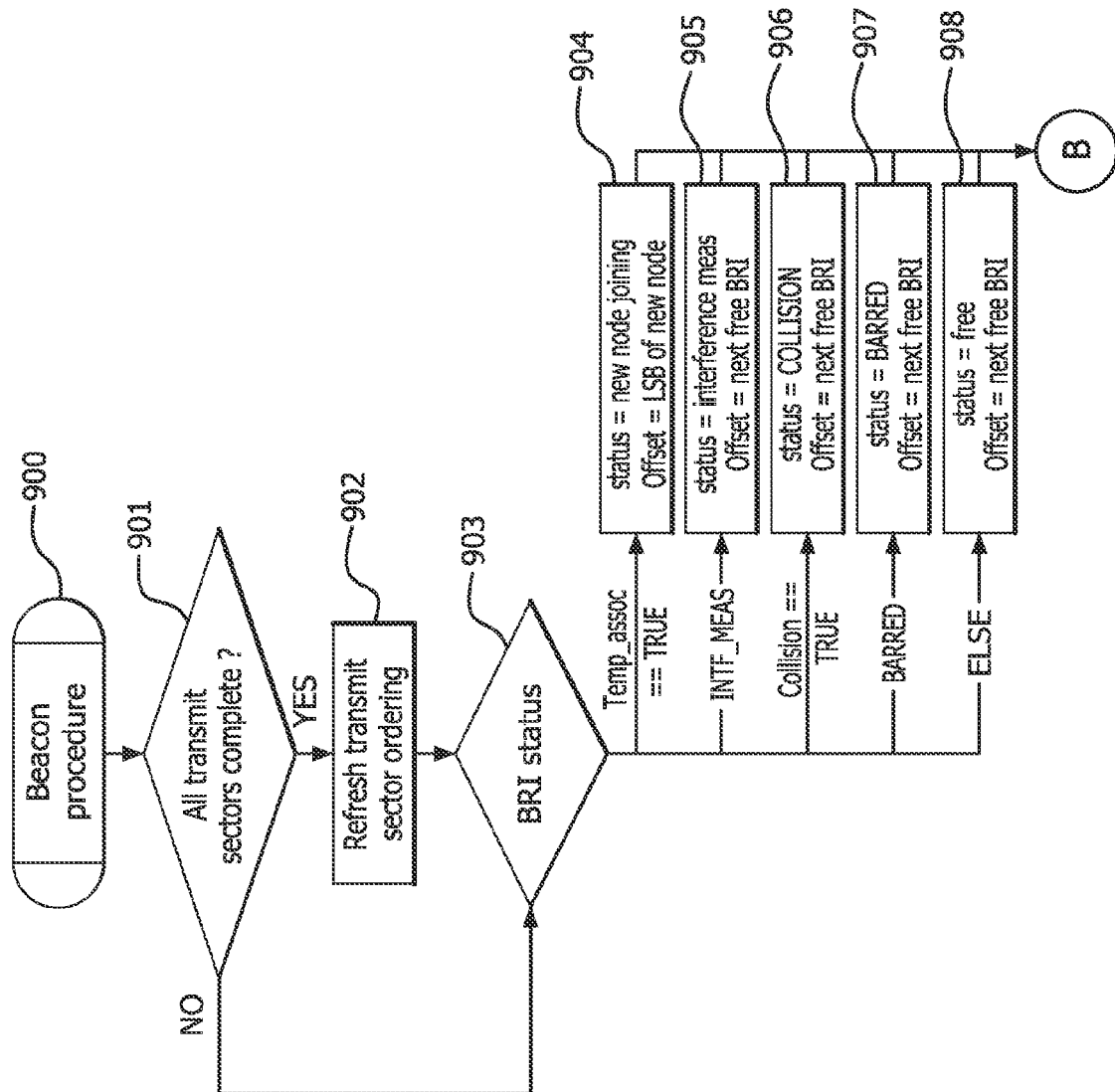

| FIG. 19 |
|---|
| FIG. 19A |
| FIG. 19B |
| FIG. 19C |

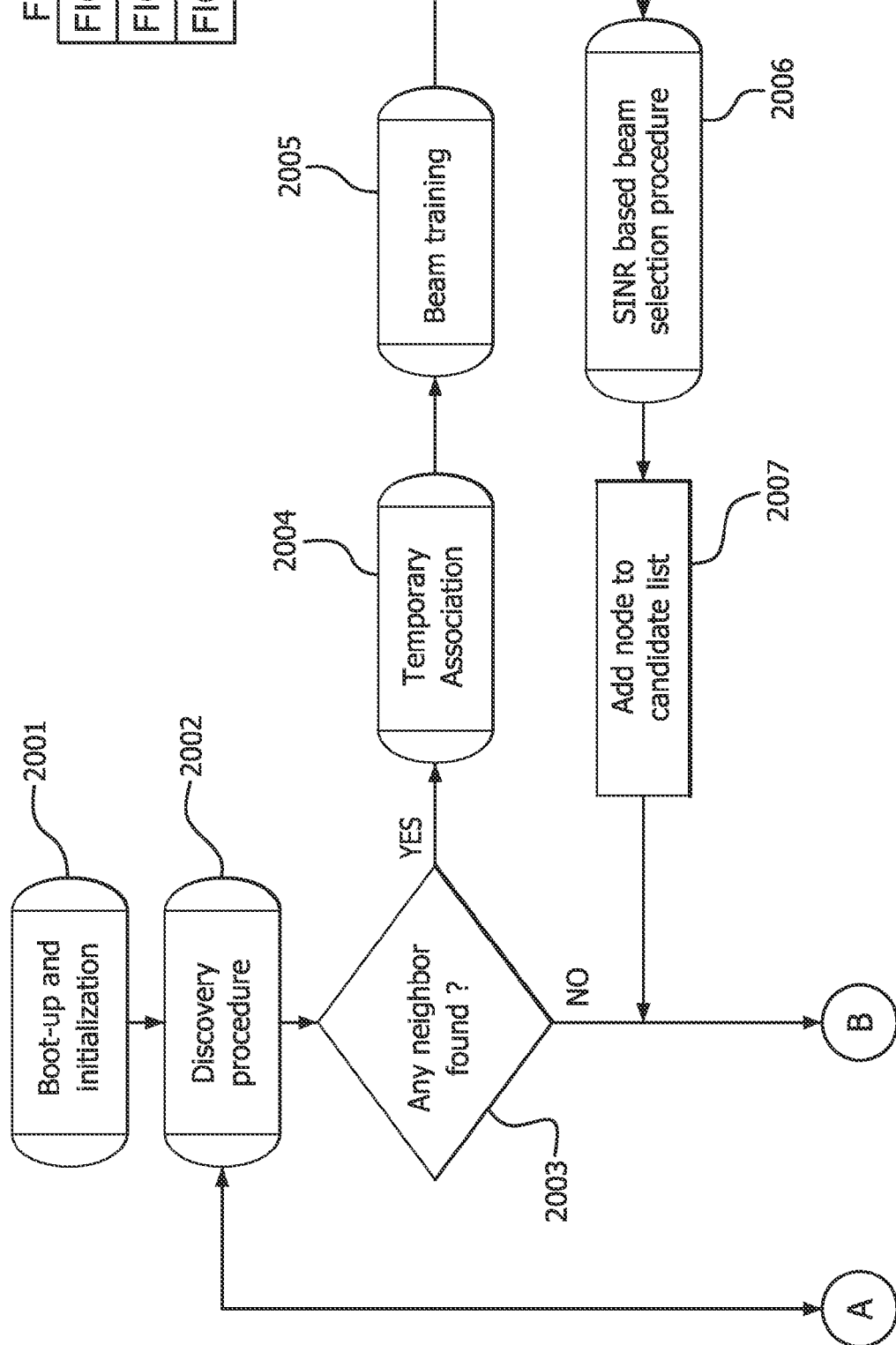

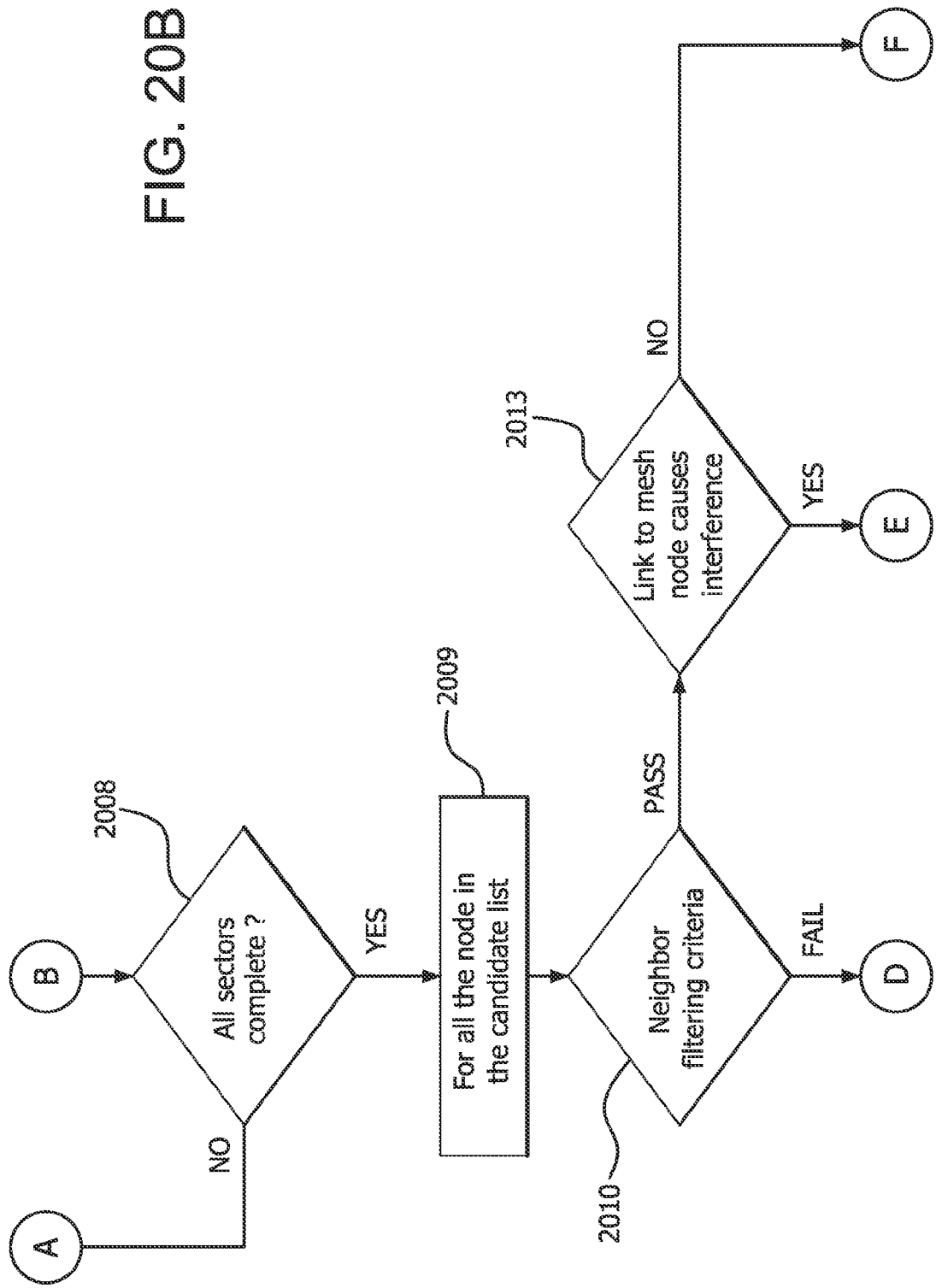

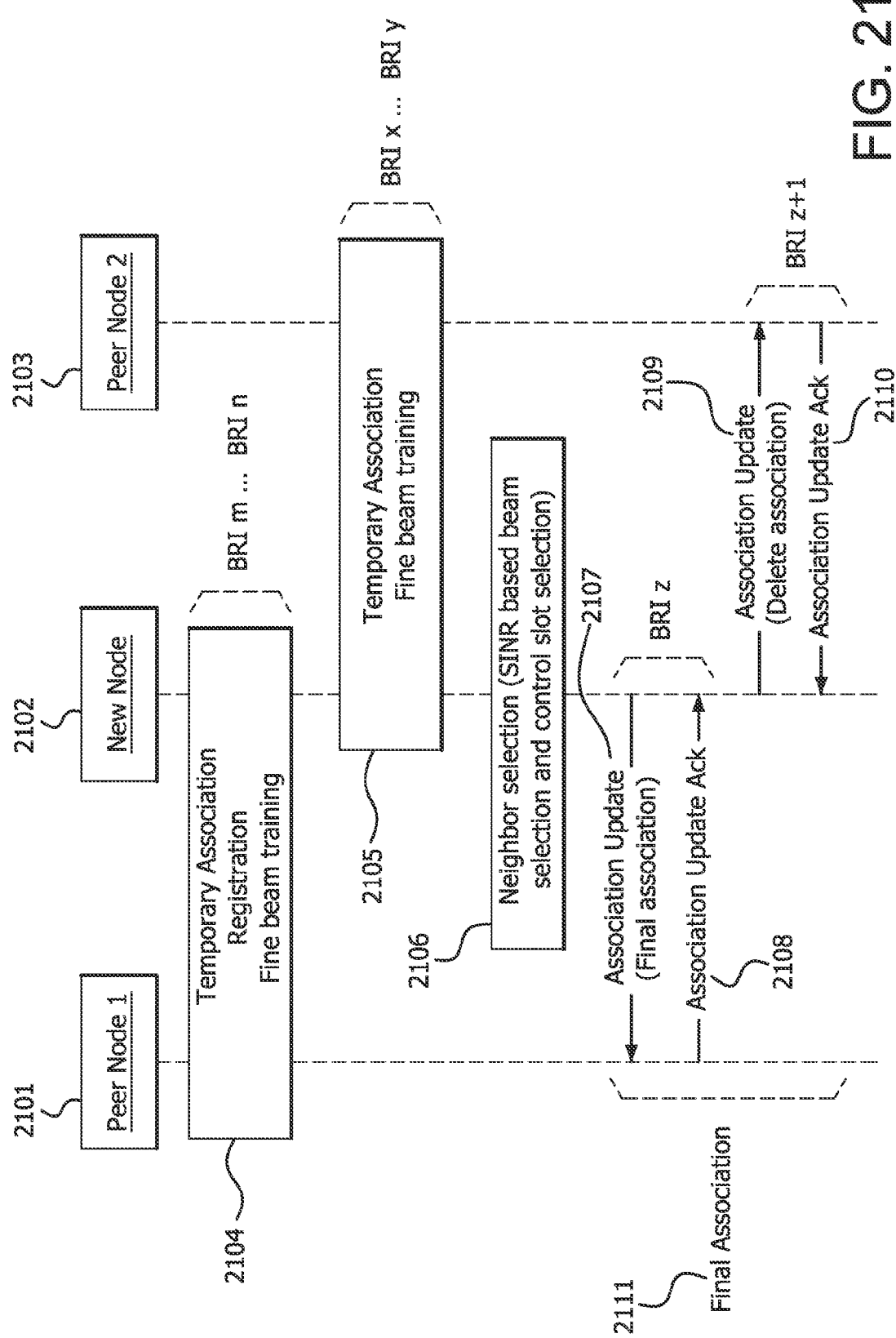

METHOD AND APPARATUS FOR DIRECTIONAL MESH INITIALIZATION

CROSS REFERENCE TO RELATED APPLICATIONS

This application claims the benefit of U.S. Provisional Patent Application No. 61/761,962 filed Feb. 7, 2013 and U.S. Provisional Patent Application No. 61/874,512 filed Sep. 6, 2013, the contents of which are hereby incorporated by reference herein.

BACKGROUND

The millimeter wave (mmW) frequencies provide a huge amount of spectrum. The 60 GHz unlicensed spectrum alone is about 7 GHz (depending on country) and there is potentially much more that may become available either as licensed, lightly licensed, or unlicensed spectrum.

In order to close the link budget for mmWs, highly directional antennas may be needed and may become practical (for example, wireless HD devices). There is a synergetic effect to be exploited at higher frequencies that is not possible below sub-6 GHz; namely, there is potential of much greater spatial reuse. The higher gain antennas that are needed for millimeter wave communications have the associated benefit of greater directionality which reduces the interference seen by unintended receivers.

At mmW frequencies, large carrier bandwidths are achievable with comparatively low fractional bandwidths. This enables single radio solutions capable of addressing large amount of spectrum. Utilizing mmW frequencies may also lead to lower power consumption because of high directional antennas and by trading bandwidth for power (Shannon's law).

However, there are many associated challenges. The mmW carriers have near optical properties with high penetration losses, high reflection losses, and little diffraction, leading to line of sight (LOS) dominated coverage. Millimeter wave frequencies are also subject to a host of propagation challenges (especially high oxygen absorption concern for 60 GHz band).

SUMMARY

A method and apparatus for association in a mesh network may be disclosed. A method in a new node may include performing a discovery procedure with a plurality of peer nodes in the mesh network, initiating a temporary association procedure with each peer node, selecting a set of peer nodes from the plurality of peer nodes based on a selection algorithm at least based on a signal-to-interference and noise ratio (SINR) with each peer node and an interference impact of each peer node, and performing a final association with the selected set of peer nodes.

BRIEF DESCRIPTION OF THE DRAWINGS

A more detailed understanding may be had from the following description, given by way of example in conjunction with the accompanying drawings wherein:

FIGS. 8A and 8B show an example of a discovery procedure for a new node;

FIGS. 9A-9C show an example of a beacon procedure for a mesh node;

FIGS. 20A-20C shows an example of a neighbor selection and final association procedure; and FIG. 21 shows an example of a final association procedure.

DETAILED DESCRIPTION

Figure 1A:
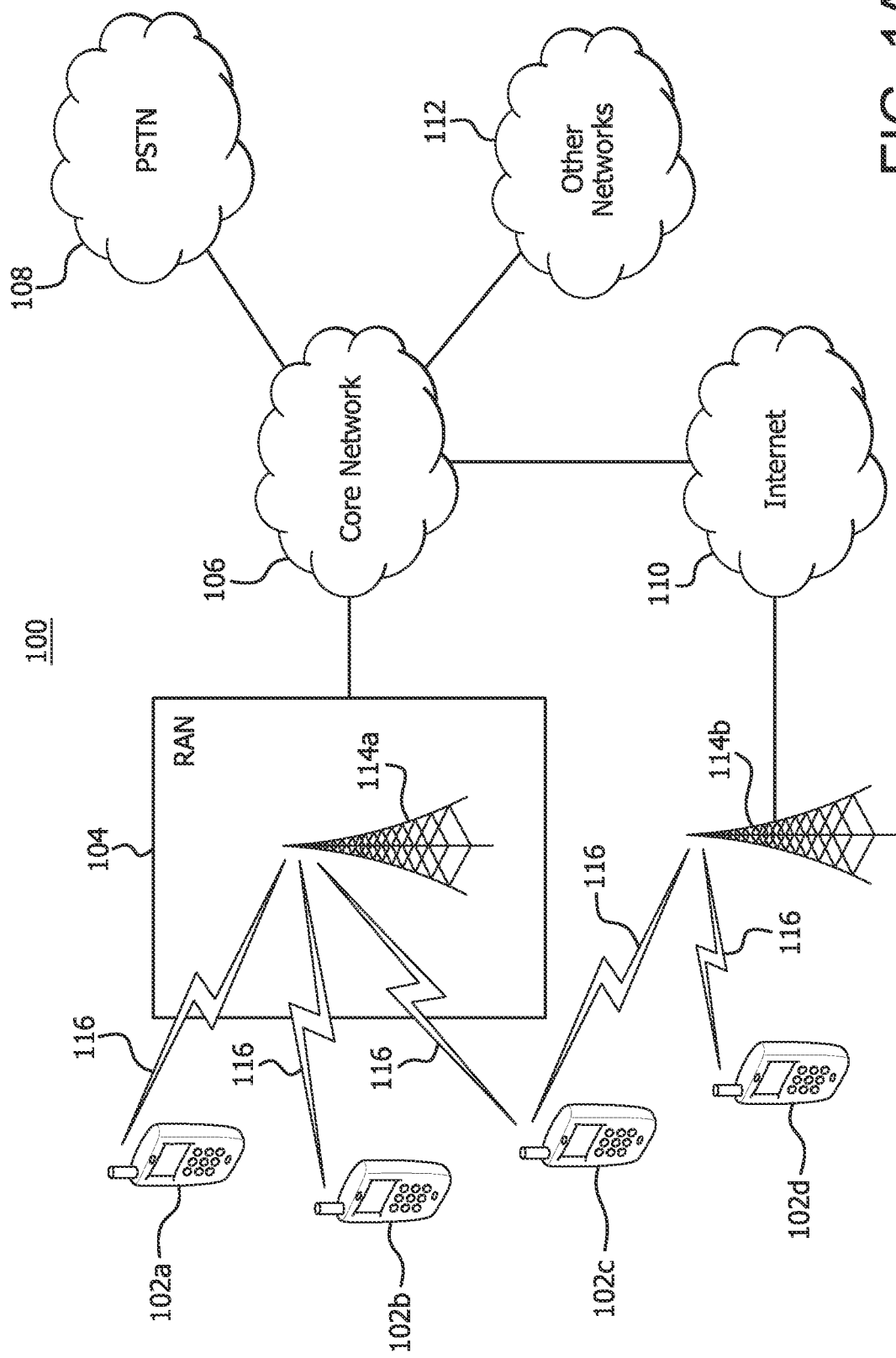
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
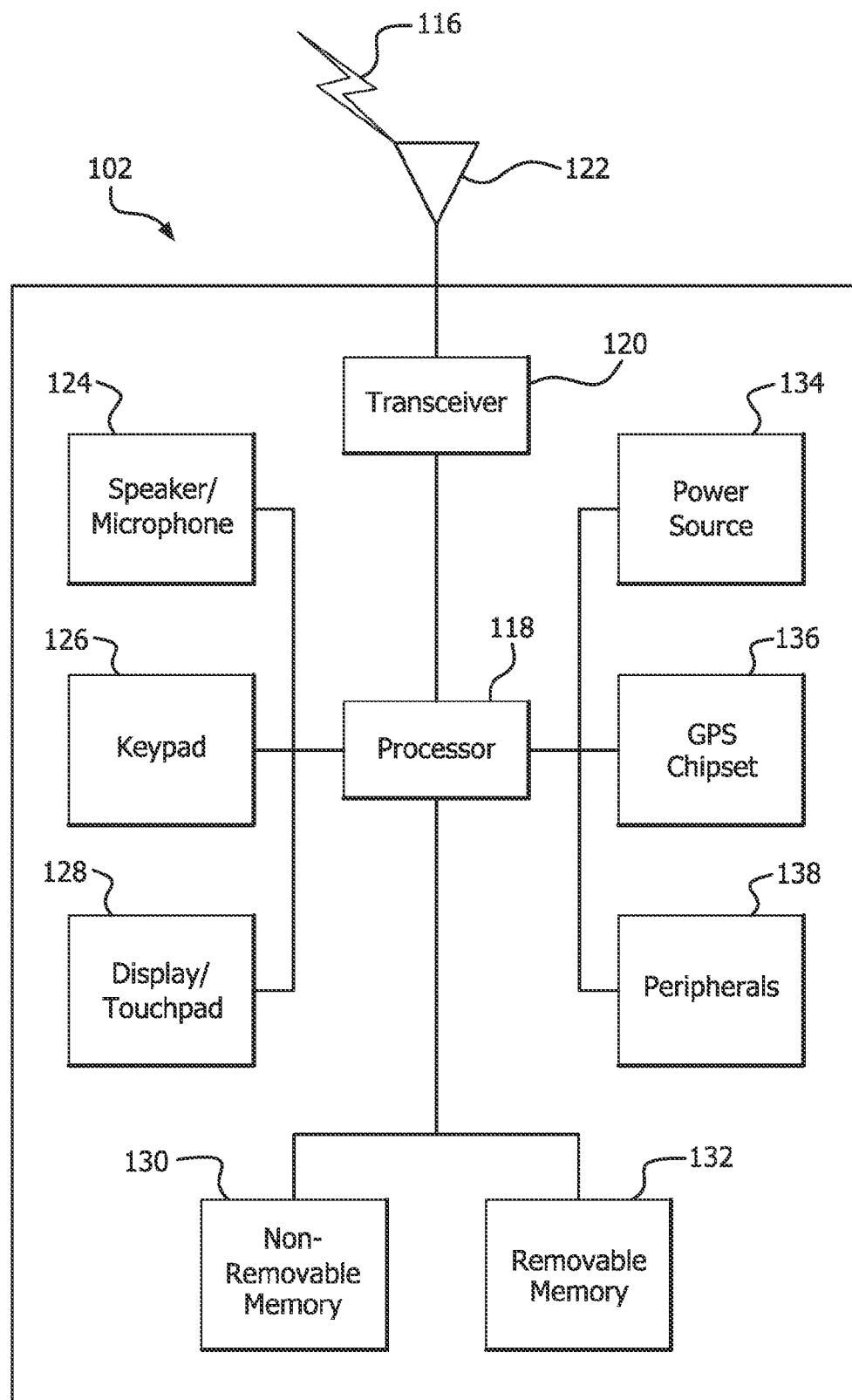
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
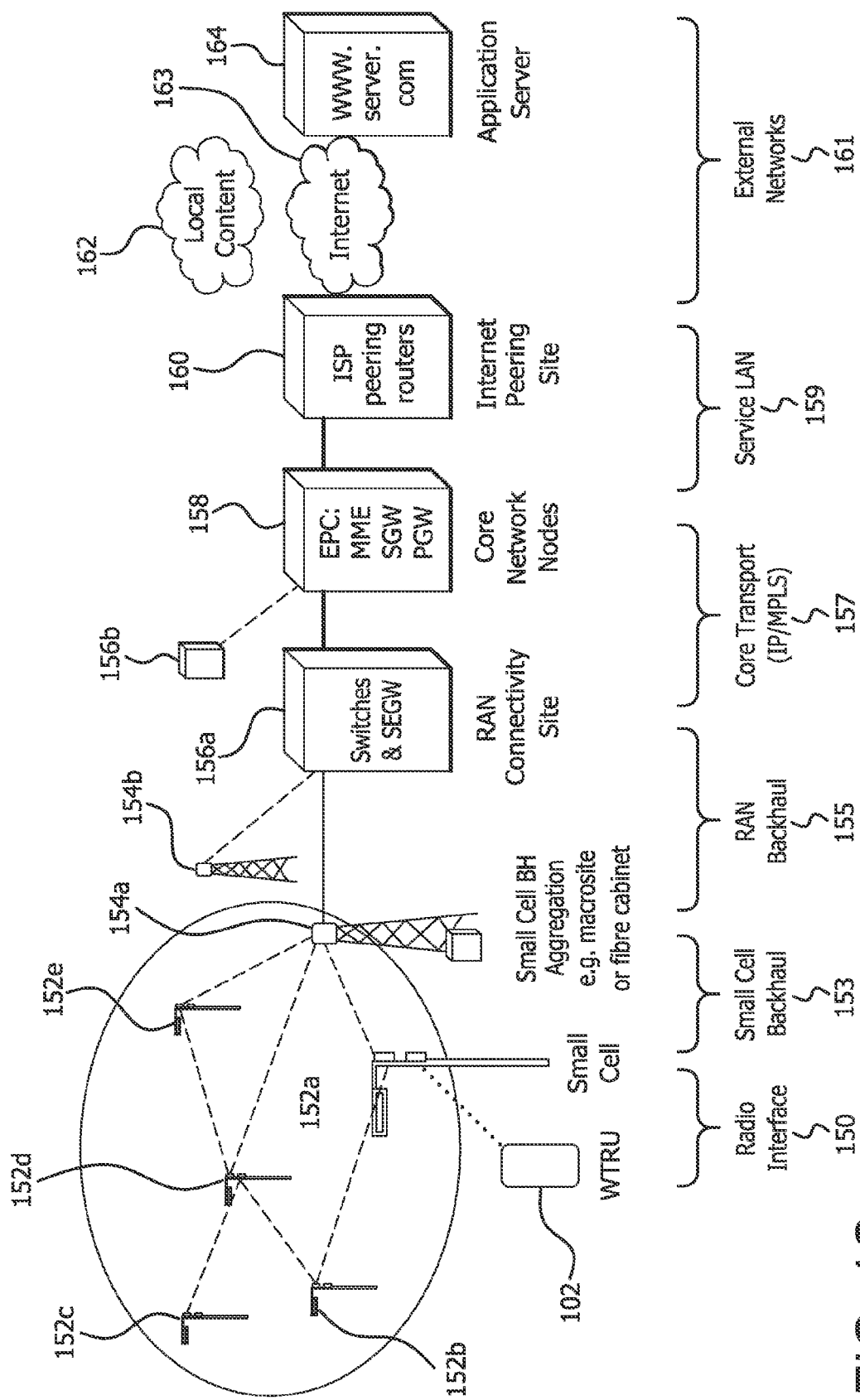
FIG. 1C is a system diagram of a small cell backhaul in an end-to-end mobile network infrastructure used within the communications system illustrated in FIG. 1A.

FIG. 1C is a system diagram of a small cell backhaul in an end-to-end mobile network infrastructure according to an embodiment. A set of small cell (SC) nodes 152a, 152b, 152c, 152d, and 152e and aggregation points 154a and 154b interconnected via directional millimeter wave (mmW) wireless links may comprise a "directional-mesh" network and provide backhaul connectivity. For example, the WTRU 102 may connect via the radio interface 150 to the small cell backhaul 153 via SC 152a and aggregation point 154a. In this example, the aggregation point 154a provides the WTRU 102 access via the RAN backhaul 155 to a RAN connectivity site 156a. The WTRU 102 therefore then has access to the core network nodes 158 via the core transport 157 and to internet service provider (ISP) 160 via the service LAN 159. The WTRU also has access to external networks 161 including but not limited to local content 162, the Internet 163, and application server 164. It should be noted that for purposes of example, the number of SC nodes 152 is five; however, any number of nodes 152 may be included in the set of SC nodes.

Figure 1D:
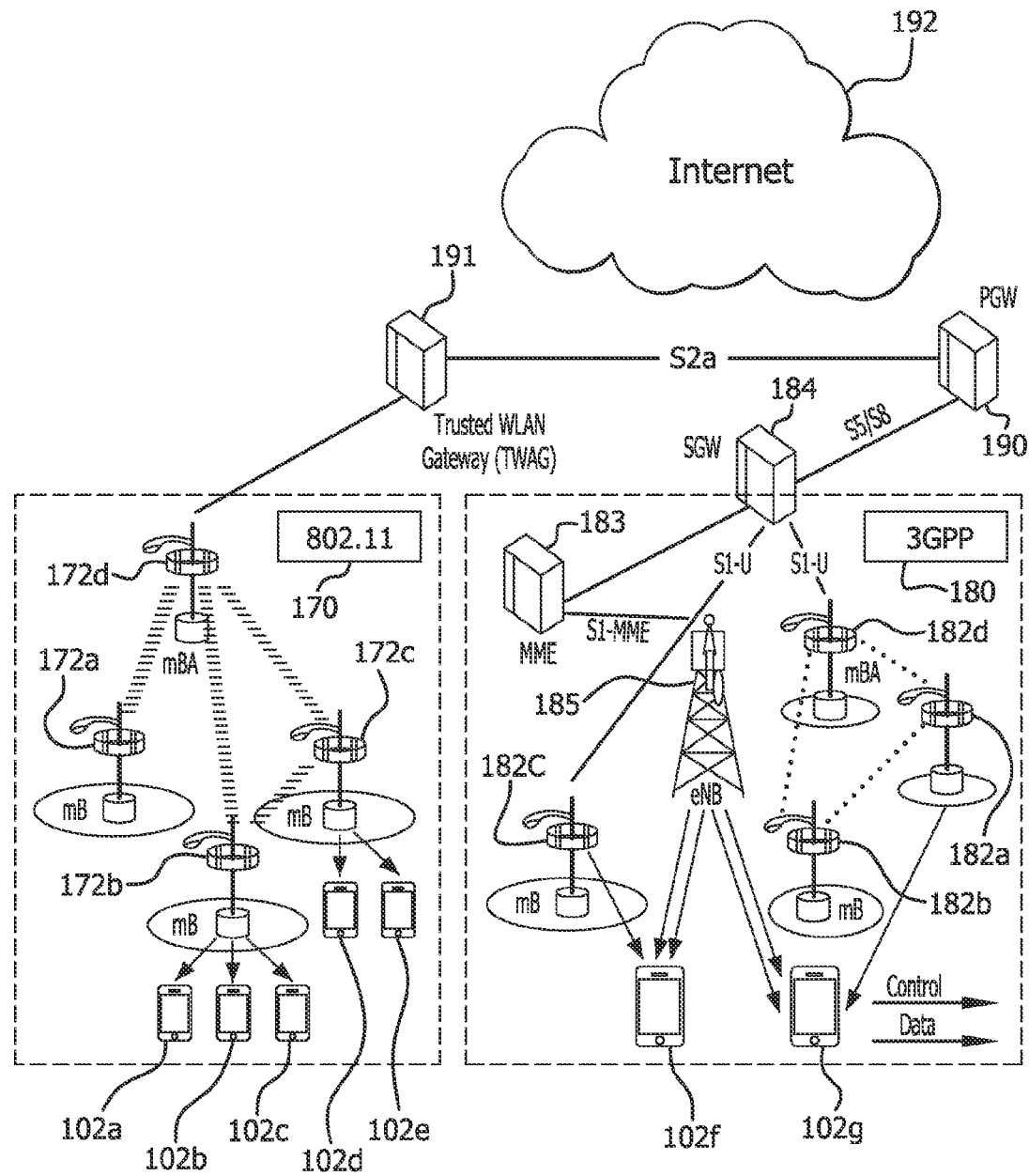
FIG. 1D is a system diagram of a mmW backhaul applied to both a 3GPP cellular network and a non-3GPP network access infrastructure according to an embodiment.

FIG. 1D is a system diagram of a mmW backhaul applied to both a 3GPP cellular network and a non-3GPP network access infrastructure according to an embodiment. In this example, the non-3GPP network is IEEE 802.11 based. The WTRUs 102a, 102b, 102c, 102d, and 102e may have access via millimeter wave base stations (mBs) 172a, 172b, and 172c in an 802.11 network 170 to a millimeter wave base station aggregator (mBA) 172d. The mBA 172d may provide access to external networks such as the Internet 192, and to the cellular network via a trusted WLAN gateway (TWAG) 191.

Also, in this example, WTRU 102f in the 3GPP network 180 may have access via mBs 182a and 182c to a mobility management entity (MME) 183 and a serving gateway (SGW) 184, which may provide access to public data network gateway (PGW) 190 and the Internet 192.

WTRUs 102f and 102g may also have access via mBs 182a and 182b via mBA 182d to SGW 184, which may provide access to public data network gateway (PGW) 190 and the Internet 192.

WTRUs 102f and 102g may also have access via an evolved Node B (eNB) 185 to the MME 183 and SGW 184, which may provide access to the public data network gateway (PGW) 190 and the Internet 192.

As shown in the examples of FIG. 1C and FIG. 1D, wireless mesh networks (WMNs) operating at mmW frequencies may be used, for example, to serve as backhaul networks for cellular or WLAN SCs such as those based on, for example, LTE or IEEE 802.11. An mmW directional mesh network may be an economical solution to provide backhaul connectivity to several cheaply deployed SCs. Directional links using highly directional antennas may be used to close the link budget at mmW frequencies. A directional mesh network may also provide a flexible topology by requiring Line-Of-Sight (LOS) with only immediate neighbors. A directional mesh network may provide easy scalability in that new nodes may be added with minimal network planning. A directional mesh network may provide robustness in redundancy provided by multiple connectivity paths between mesh-nodes. A directional-mesh network may be configured with fully distributed scheduled, multi-hop, and time division multiple access (TDMA) based directional mesh MAC features to ensure fast scheduling and short queue times.

Wireless mesh networks (WMNs) may operate on mmW frequencies. An example application of the mmW frequencies may be a backhaul network for cellular or wireless local area network (WLAN) small cells (SCs) such as those based on LTE, IEEE 802.11 and other standards. An mmW directional mesh network may be an attractive economical solution to provide backhaul connectivity to SCs. Directional links utilizing highly directional antennas may be used to close the link budget at mmW frequencies. The backhaul network may include a set of small-cell nodes and aggregation points interconnected via directional mmW wireless links, resulting in a "directional-mesh" network.

A directional mesh network has advantages of flexibility, scalability, robustness, distributed directional-mesh MCA, distributed mesh entry procedures, and the like. The directional mesh may provide flexible topology by requiring line of sight requirements with immediate neighbors as opposed to the aggregation point. For scalability, new nodes may be added with minimal network planning. For robustness, redundancy may be provided by multiple connectivity paths between mesh-nodes provide robustness. For distributed direction-mesh MAC, a fully distributed, scheduled, multi-hop and time division multiplexing (TDM)-based directional mesh MAC features may ensure fast scheduling and short queue times. For distributed mesh entry procedures, lack of central control and manual configuration may result in reduced installation cost and need for manual skilled labor.

The embodiments for mesh initialization and formation may address the need for a self-configurable, self-optimizing directional node discovery and association procedure.

The mesh formation and association procedures are independent of any MAC layer implementation. It may be applicable to any physical layer using directional transmissions. The procedures in accordance with the embodiments disclosed hereafter may be fully distributed, synchronized, directional, and self configurable. This also fits well with the distributed MAC and distributed scheduling function that determines each node's transmission schedule to its neighbors and may be interference and traffic-aware.

The mesh formation procedure in accordance with embodiments disclosed hereinafter may differ from the conventional omni-directional mesh such as an IEEE 802.11s-based network in several ways. While the 802.11s standard assumes that each node may communicate with every other node within a communication range, the embodiments disclosed hereafter may be designed for directional communications. The fully scheduled, time division multiple access (TDMA) MAC structure of the embodiments may also be different from the 802.11s systems, which rely on contention-based channel access for data transmission, which may severely constrain system throughput. Two phase association procedures in accordance with the embodiments may enable self-organizing mesh network without manual intervention or configuration. This may make installation of new mesh nodes easier and reduce the cost needed for skilled labor to install the new nodes.

The signal-to-interference and noise ratio (SINR)-based beam selection procedures in accordance with embodiments disclosed below may be independent of any MAC implementation. It may be applied to any network using directional transmit/receive antennas. The SINR-based beam selection procedures may be seen as a proactive approach to interference reduction. The interference-aware beam selection procedures disclosed below may enable a smooth operation of the mesh network, which may scale well causing minimal interference on the existing network.

The embodiments disclosed herein may be applicable to different mode of network operations including, but not limited to, infra-structure operation, personal basic service set (PBSS) operation, and the like.

Wireless communication at millimeter wave frequencies may allow use of a high gain antenna due to small wavelengths. This may enable the transmitted power to be concentrated in the direction of the intended receiver, which may also use a directional antenna for reception. This spatial containment of the signals may not only allow longer communication ranges but may also allow multiple spatially separated transceivers to operate simultaneously in sharing the medium. On the other hand, conventional multi-hop mesh networks may generally be limited in throughput due to channel access constraints resulting from omni-directional transmission. The network throughput of a directional mesh in accordance with the embodiments disclosed hereafter may be much larger due to efficient spatial reuse. The directional transmissions may achieve much larger range than omni-directional transmission. As a result, the beacon transmissions, which aid in the discovery, may also be directional. Such directional beacons may require association procedures that are different from the conventional 802.11 standards.

The wireless mesh network under consideration may include regular mesh nodes and an aggregation node(s). The aggregation node may be connected to a high-capacity back-end network(s) such as an optical fiber network, and the like.

Embodiments for device discovery designed for directional mesh architecture may be described hereafter. Each network node may periodically transmit a beacon frame to allow a new node(s) to join the mesh network. This beacon frame may have sufficient information for the new node to identify the network that includes the transmitting node and other information required to join the network. In order to overcome large propagation loss at millimeter wave frequencies, transmit and/or receive antenna beamforming may be used for long-range, high data-rate communication.

The beacon frame may include a beacon count. Each transmitted beacon frame may be sequentially numbered. The beacon frame may include a network identifier. This may allow the new node to search for the mesh network that it wants to join. The beacon frame may include a node identifier, which may allow a new node to identify the transmitting mesh node when it receives beacons from multiple nodes. The beacon frame may include a timestamp, which may be the transmitting node's internal clock value at transmission time. This may allow the new node to reset its internal clock accordingly, so that future time-slots may be accurately predicted.

The beacon frame may include empty beacon slot location information, which may be the time offset from the current timestamp to the next empty beacon slot reserved for a beacon response interval (BRI). The beacon frame may include a new node discovery indicator. When the empty beacon slot location field contains a value larger than the beacon interval, if the new node discovery indicator is set, it may indicate that the node has received a valid beacon response from a new node in the previous empty beacon period. This indicator may be ignored when empty beacon slot location element value is smaller than the beacon interval.

The beacon frame may include a path quality metric. The path quality metric parameter may convey to the new node the path quality to the aggregation node. This may be a traffic-aware path metric that allows the new node to select network nodes for further fine beam training and association based on its backhaul requirements.

Figure 2:
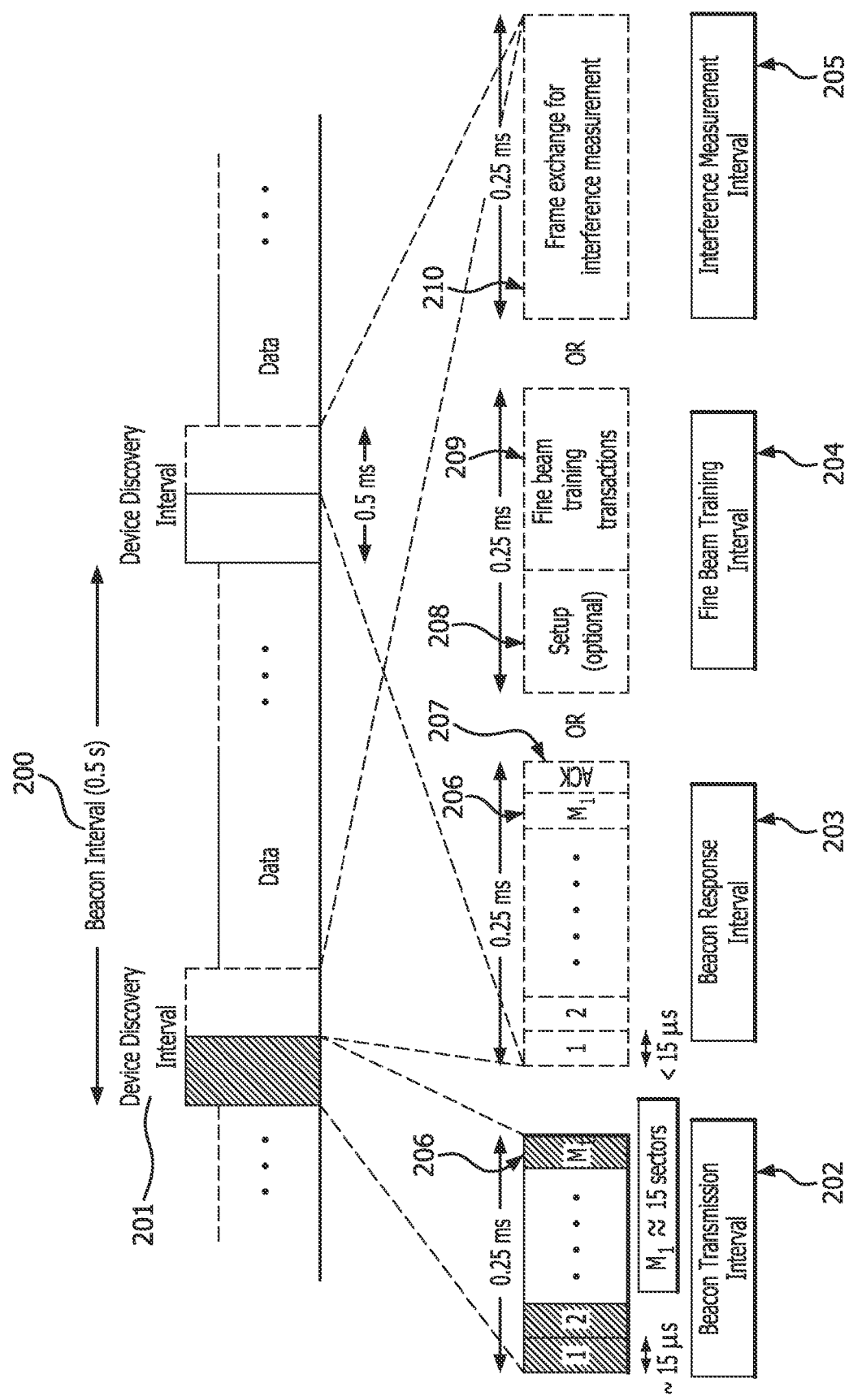
FIG. 2 shows an example super-frame structure with beacon transmission intervals (BTIs) and beacon response intervals (BRIs) occupying the same device discovery interval (DDI)

Each existing mesh node in the mesh network may transmit multiple beacon frames during the beacon transmission interval (BTI) which is part of the device discovery interval (DDI). FIG. 2 shows an example super-frame structure with BTIs and BRIs occupying the same DDI (described in further detail below).

A new node upon power-up may first listen directionally to determine the presence of an existing mesh network(s), which is indicated by beacon transmissions. When no beacon frames are received within a pre-determined time, the new node may initiate a new mesh creation by starting directional beacon transmissions. These frames may be transmitted sequentially in multiple directions so that all transmission directions are covered in a beacon transmission cycle. A beacon transmission cycle, during which the node completes beacon transmissions in all supported directions, may include multiple beacon intervals (BIs). A discovery range may be increased via narrow beamwidths, but this may increase the device discovery delay. Each transmitted beacon frame may be identical except for the sequence number and the timestamp and may provide sufficient information for a new node to proceed to the initialization.

Mesh nodes may randomly change the order of beacon transmissions at the start of every BTI. This may reduce the chances of beacon collisions in consecutive beacon intervals.

The candidate node may use a directional receive antenna pattern for beacon reception. The receive antenna pointing direction may be changed periodically to cover all supported directions. A listening interval of one BI in each direction ensures that a new node may receive a beacon frame in a cycle lasting (K×BI), where K is the number of receive antenna directions used by the new node. The receive antenna gain mainly determines the device discovery range. The required antenna gain may be related to the receive antenna beamwidth, which, in turn, may determine the required number of receive directions to cover all supported directions.

After some pre-determined period in the receive mode, during which the new node scans the medium directionally, the new node may receive beacon frames from all reachable neighbors. The new node may then choose one of the nodes from which it received a beacon to perform initial network notification. This determination may be based on factors such as received beacon strength, a value of the mesh path metric included in the beacon frame, mesh node capability advertised in the beacon frame, and the like. If a traffic-aware path metric is used for path determination in the mesh, its inclusion in the transmitted beacon may allow the new node to choose the mesh node for network notification based on network traffic loads. The network node chosen by the new node for beacon response transmission may be called a "primary node."

Alternately, the new node may choose the first node from which it receives a beacon frame as the primary node. The primary node may coordinate the process for the new node to join the network.

Regardless of the way in which the primary node is selected, the new node may transmit a beacon response frame in the direction of the primary node during the next empty beacon slot, which was previously indicated in the beacon frame. The new node may use an angle of departure (AoD) that is the same as the angle of arrival (AoA) which it received the strongest beacon frame from the primary node for the beacon response frame transmission, and may adjust the power level to the pre-configured level. All network nodes may switch through their receive antenna patterns during the empty beacon slot to receive beacon response frames from new nodes that intend to join the network. The mesh nodes may use the same sequence of AoA directions as AoD directions used for beacon transmissions during the BTI. When an empty beacon slot is used for beacon response transmission it may be called a beacon response interval (BRI).

The beacon response frame contents may include a MAC/node identifier. The new node may include its MAC identifier while communicating with the primary node. The beacon response frame contents may include a network join request. The beacon response frame contents may include primary node identifier echo. This may allow the desired mesh node to identify the response, in case the response frame is received by multiple mesh nodes. The primary node identifier echo may not be included if the response frame is spread using a pseudo-random sequence derived from the chosen primary node identifier.

The beacon response frame contents may include a discovered neighbor list. A new node may include node identifiers of all received beacon frames and received signal strength indicator (RSSI). This list may be conveyed to the network controller. The controller may then use this information to aid in the identification of the candidate neighbor set.

The beacon response frame contents may include location information. The location information may be obtained from Global Positioning System (GPS) or other means. The controller may use this information to aid in the identification of the candidate neighbor set.

The primary node, upon receiving a beacon response frame from a new node during one of the receive slots in BRI, may transmit a beacon response acknowledgement frame using an appropriate AoD. The acknowledgement may be transmitted during the last $(M_1+1)$ slot in the BRI, where $M_1$ is the number of beacon transmissions during the BTI. If the mesh node chosen by the new node responds with a beacon response acknowledgement, then it may become the primary node for the new node and may coordinate subsequent initialization procedures for the new node.

The beacon response acknowledgement frame contents may include a beacon response acknowledgement element. The beacon response acknowledgement frame contents may include a MAC identifier of the new node echo, which indicates to the new node that its beacon response message was correctly received by the network node. By including the new node's identifier, the network node may continue with the initialization procedure with one of the responding new nodes, in case multiple beacon responses were received during the empty beacon slot. Alternately, the primary node may exclude the MAC identifier of the new node echo and implicitly address the new node by spreading the response acknowledgement message with a pseudo-random sequence derived from the new node's identifier.

The beacon response acknowledgement frame contents may include a MAC identifier/node identifier of the primary node. The beacon response acknowledgement frame contents may include next empty beacon slot information.

If a new node does not receive a beacon response acknowledgement at the end of the BRI, it may be due to the facts that the mesh node received beacon responses from multiple new nodes during the BRI and chose to transmit the beacon response acknowledgement to another new node or that the new node's beacon response was not correctly received by the primary node. The second event may be caused by a temporary obstruction, or due to non-perfect reciprocity between the transmit and receive beams at either of the two nodes. The new node may distinguish between these two reasons by examining the next available empty beacon slot location in the next beacon transmission from the primary node. If the next available empty beacon slot is not scheduled at the expected time and the new node discovery indicator is set, then it may indicate that the primary node has reserved it for fine beam training with another new node. The new node may then either wait till the next available empty beacon slot to transmit its beacon response frame to the same primary node, or choose another network node as the primary node and transmit a beacon response during the next available empty beacon slot. If the next available empty beacon slot is scheduled by the primary node at the expected time, it may mean that the new node's response was not correctly received by the primary node. The new node may re-transmit the beacon response message during the next empty beacon slot, for example, with a different transmit beam shape. Multiple retransmission attempts in consecutive BRIs may be permitted, up to a pre-defined limit, for the new node to try out different transmit antenna patterns.

If beacon response messages from multiple new nodes collide during a BRI, the mesh node may be unable to decode any of them correctly. The mesh node may then transmit a beacon acknowledge frame with the new node MAC identifier filled with all zeros. This may indicate to all the simultaneously transmitting new nodes that their responses collided. The new nodes may then perform random backoff and re-transmit their beacon responses in BRIs after random delays.

A BRI may immediately follow a BTI within the same DDI. This may allow a new node receiving one of the directional beacons to immediately respond during the BRI and start the association process.

FIG. 2 shows the super-frame structure including the location of the occupied and empty beacon slots in the DDI. FIG. 2 shows a beacon interval 200 that includes a DDI 201. The DDI 201 includes a BTI 202 and a BRI 203 or a fine beam training interval 204 or an interference measurement interval 205. The BTI 202 may include up to M1 206 transmissions, where M1 is approximately 15. The BRI 203 may also include up to M1 206 transmission and a beacon response acknowledgement frame 207. The fine beam training interval 204 may include an optional setup 208 and fine beam training transactions 209. The interference measurement interval 205 may include a frame exchange for interference measurement 210.

Both the occupied and the empty beacon slots may be 0.25 ms long. The occupied beacon slots correspond to the BTI 202 and the empty beacon slots correspond to the BRI 203 or other functions, such as fine beam training 204 and interference measurement 205, which are described in detail below. Assuming 15 µs long beacon messages, approximately 15 transmissions 206 may be possible during one BTI 202 after accounting for some beam switching delays between transmissions. Due to the smaller size of beacon response frame, the beacon response acknowledgement frame 207 may be accommodated in the same duration during a BRI 203.

Alternately, the BTI may occupy an entire DDI, and there may be several consecutive BTIs followed by one or multiple BRIs in separate DDIs.

Figure 3:
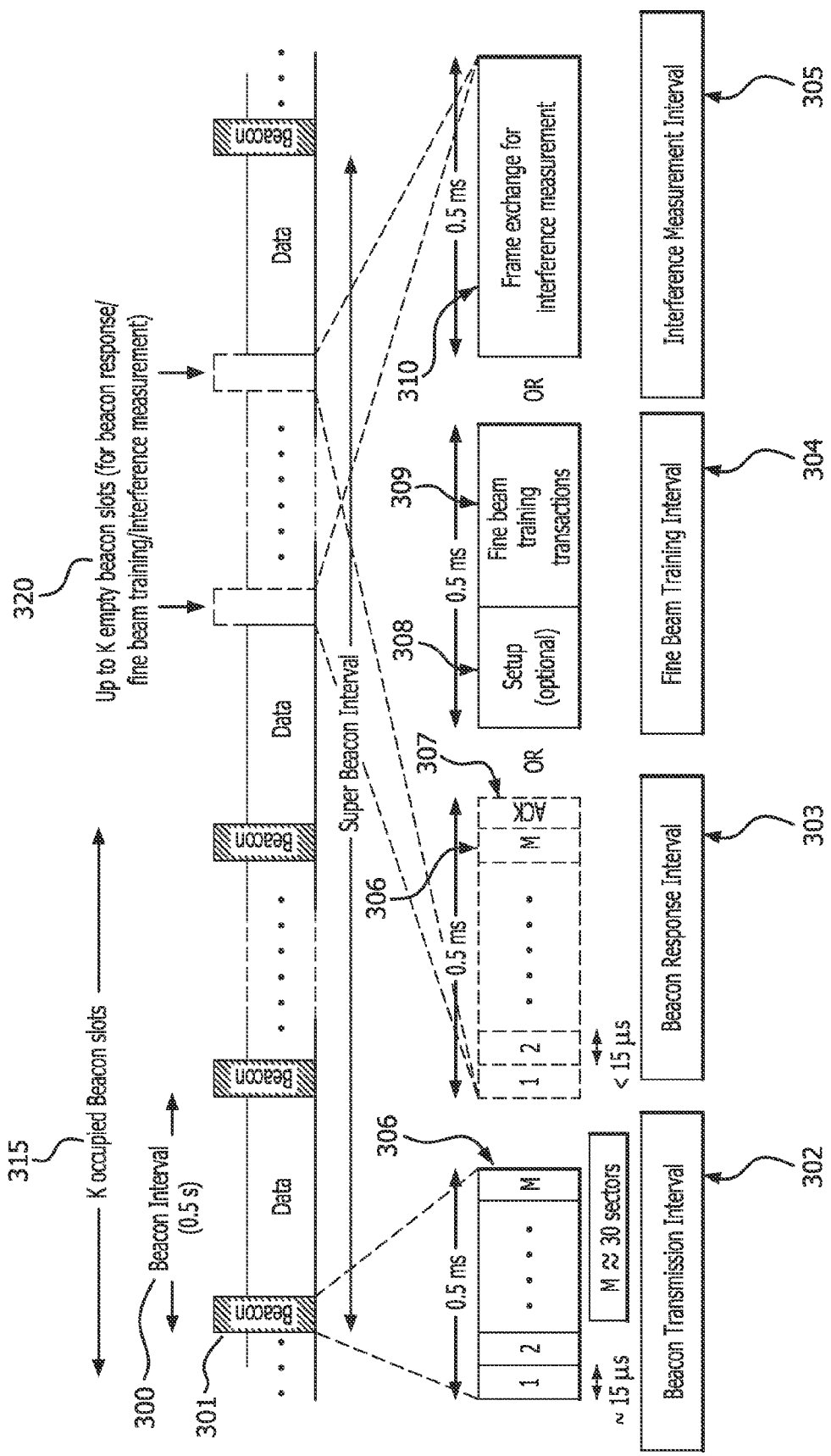
FIG. 3 shows an example super-frame structure with BTIs and BRIs occupying different DDIs.

FIG. 3 shows an example super-frame structure with BTIs and BRIs occupying different DDIs. FIG. 3 shows a beacon interval 300 in K occupied beacon slots 315. The beacon interval 300 includes a DDI 301 includes a BTI 302. The BTI 302 may include up to M 306 transmissions, where M is approximately 30. K empty beacon slots 320 may be used for a BRI 303, a fine beam training interval 304, or an interference measurement interval 305. The BRI 303 may also include up to M 306 transmission and an ACK 307. The fine beam training interval 304 may include an optional setup 308 and fine beam training transactions 309. The interference measurement interval 305 may include a frame exchange for interference measurement 310.

This example allows a new node to scan multiple directions for beacons and then respond during one of the BRIs in the direction of strongest beacon reception. As shown in FIG. 3, each of the vacant DDIs may be used for other purposes that may interfere with regular data transmissions such as beam training or interference measurements.

Alternatively, BTI and BRI slots may alternate within a DDI. In this case, the mesh node may transmit a directional beacon, followed by a listening period in the same direction, before transmitting another beacon in a new direction.

Figure 4:
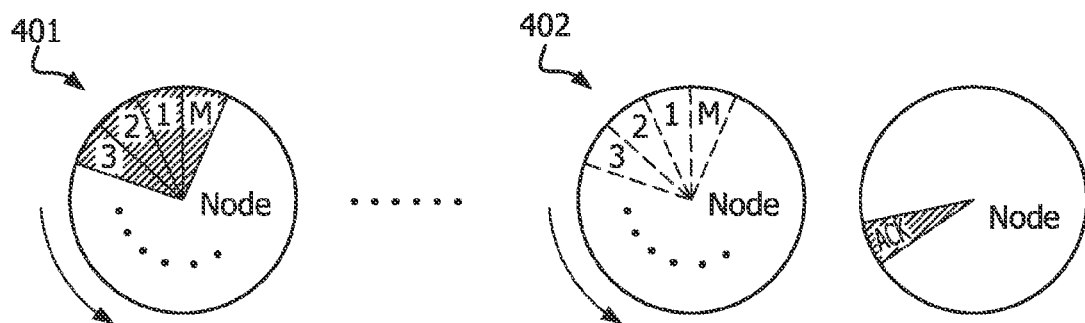
FIG. 4 shows an example device discovery procedure at the network node, showing directional communications with the new node during BTI and BRI.

FIG. 4 shows an example device discovery procedure at the network node, showing directional communications with the new node during BTI and BRI. As illustrated on the left side 401 of FIG. 4, during each BTI, the beacon may be sequentially transmitted in M1 different directions. This may cover all M supported direction in M/M1, succession BTIs, where M/M1 is an integer. As illustrated on the right side 402 of FIG. 4, during BRI the mesh node may receive sequentially in M1 different directions corresponding to the beacon transmission directions during BTI. This may be followed by an ACK transmission in the direction of the received beacon response from the new node.

Figure 5:
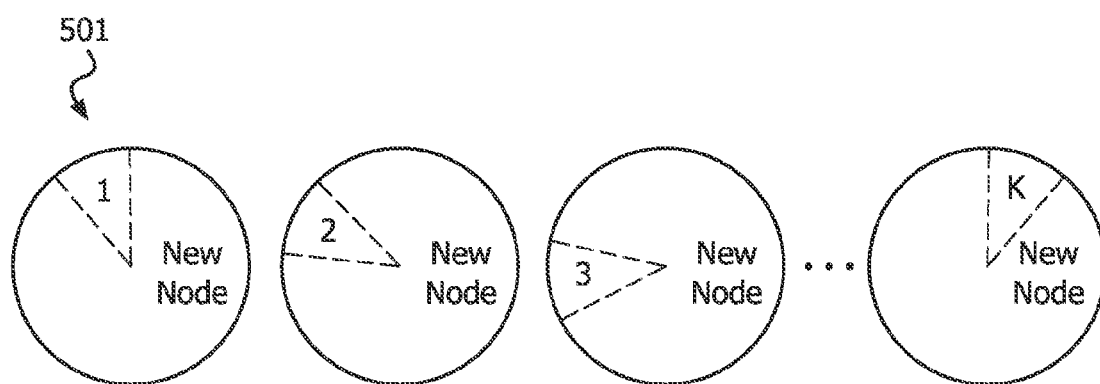
FIG. 5 shows an example device discovery procedure at the new node, showing directional communications with the communicating network node during BTI and BRI.
Figure 5:
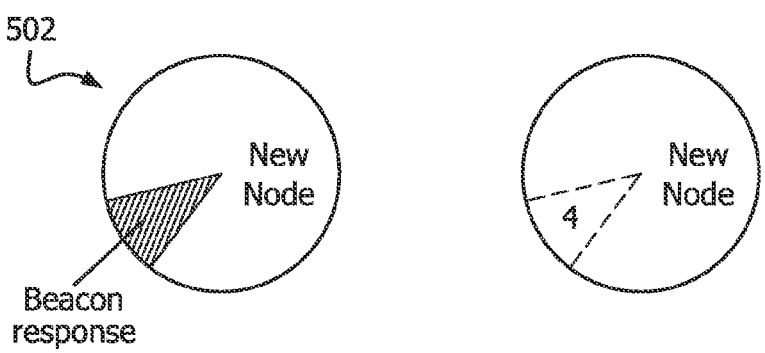

FIG. 5 shows an example device discovery procedure at the new node, showing directional communications with the communicating network node during BTI and BRI. As illustrated in the top portion 501 of FIG. 5, the new node may listen in a particular direction for a beacon interval (BI) and then switch to a new receive direction. The new node may complete receiving in all supported receive directions in K BIs. As illustrated in the bottom portion 502 of FIG. 5, the new node may transmit a beacon response in the direction of the strongest beacon reception, and then listen in the same direction for an ACK form the network node during BRI.

In FIGS. 4 and 5, the frame exchange sequence may lead to device discovery from the mesh node's and new node's perspectives, respectively. During the BTI, the network node may transmit a beacon frame directionally while the new node receives directionally. During the BRI, the new node may transmit a beacon response frame directionally while the network node receives directionally. After receiving in all directions, the network node may switch to a transmit mode to transmit a beacon response acknowledgement frame to the new node. It may be noted that the number and beamwidth of the antenna patterns at the new node and the network nodes may be different.

In a fully synchronized mesh with common beacon periods (without any staggering in time) the chances of beacon collision at the receiver of a new node may be high. This beacon collision may either result in the new node using less than the actual number of neighbors or not having connectivity to the mesh network at all. To avoid beacon collision, the beacon order may be randomized. During each BTI, beacons may be transmitted in the M different directions, one direction at a time. The order of the beacon transmissions may be chosen by a pseudo-random sequence instead of sequentially using the beams in clockwise or counter-clockwise. The sequence may be derived by using the node-ID/network ID or the MAC address and may optionally use the frame number. The sequence may be detected by the receiver as the node-ID/network-ID/MAC address/frame number is transmitted in beacons. In one option, a custom beacon sequence for the n+1 beacon may be signaled in the nth beacon. This randomization may prevent frequent collisions if a fixed order is followed among multiple transmitters.

Figure 6:
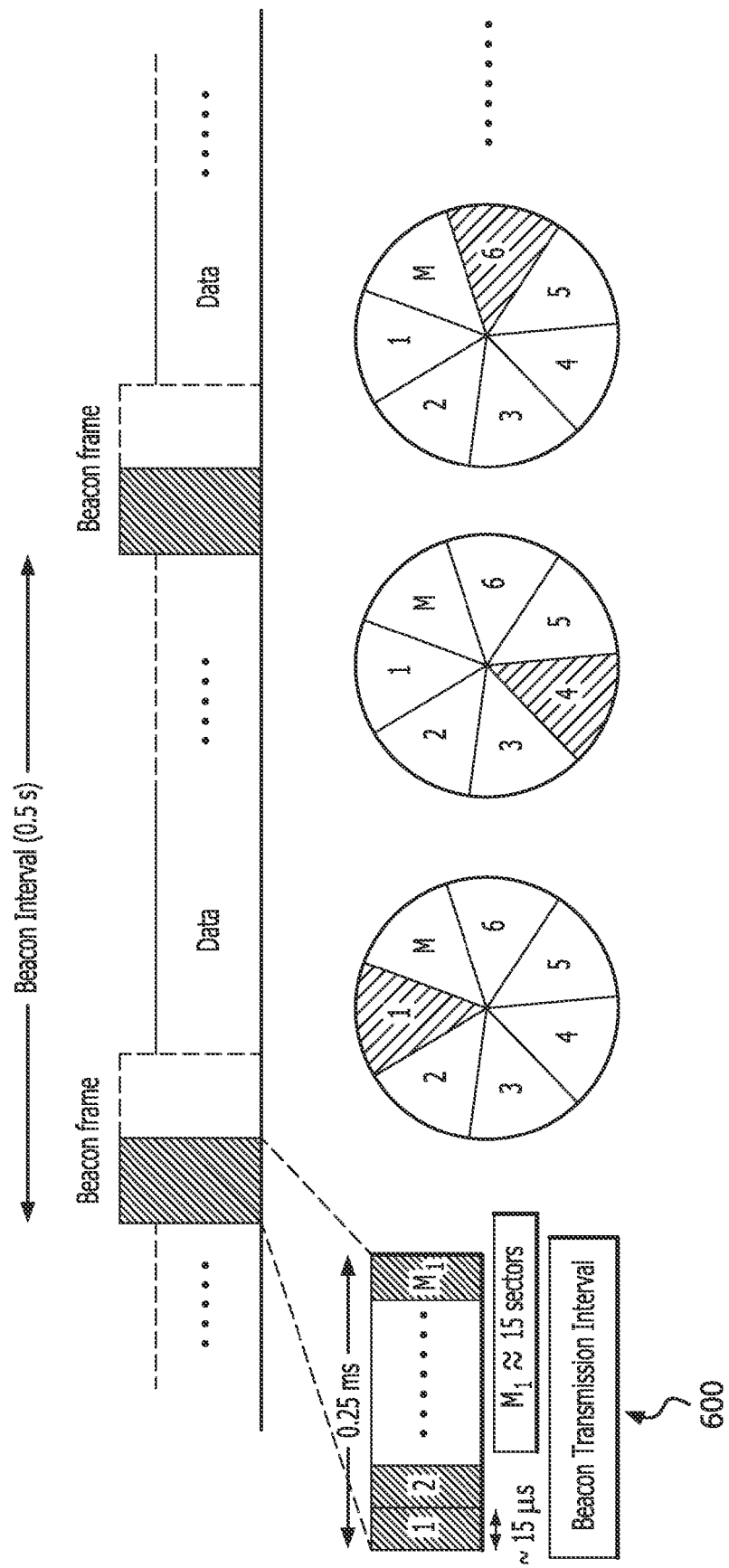
FIG. 6 shows an example of beacon order randomization.

FIG. 6 shows an example of beacon order randomization. In FIG. 6, a beacon 600 is transmitted in a random sequence {1, 4, 6 . . . }, instead of a sequential order {1, 2, 3 . . . }.

BRI periods may be used for beacon response transmission, interference measurements and mesh initialization procedures, and the like. When the interference measurements or mesh initialization procedures are ongoing during the BRI periods, other new nodes may be excluded or denied access to the BRI periods. This may be achieved by signaling a BRI busy indication in the beacon transmitted during the corresponding BTI period. This process is called BRI reservation. In addition to reservation indication, the mesh node may also provide an offset to the next available BRI period using a BRI offset field.

The BRI reservation information may be used by a new node to detect a possible BRI collision.

Figure 7:
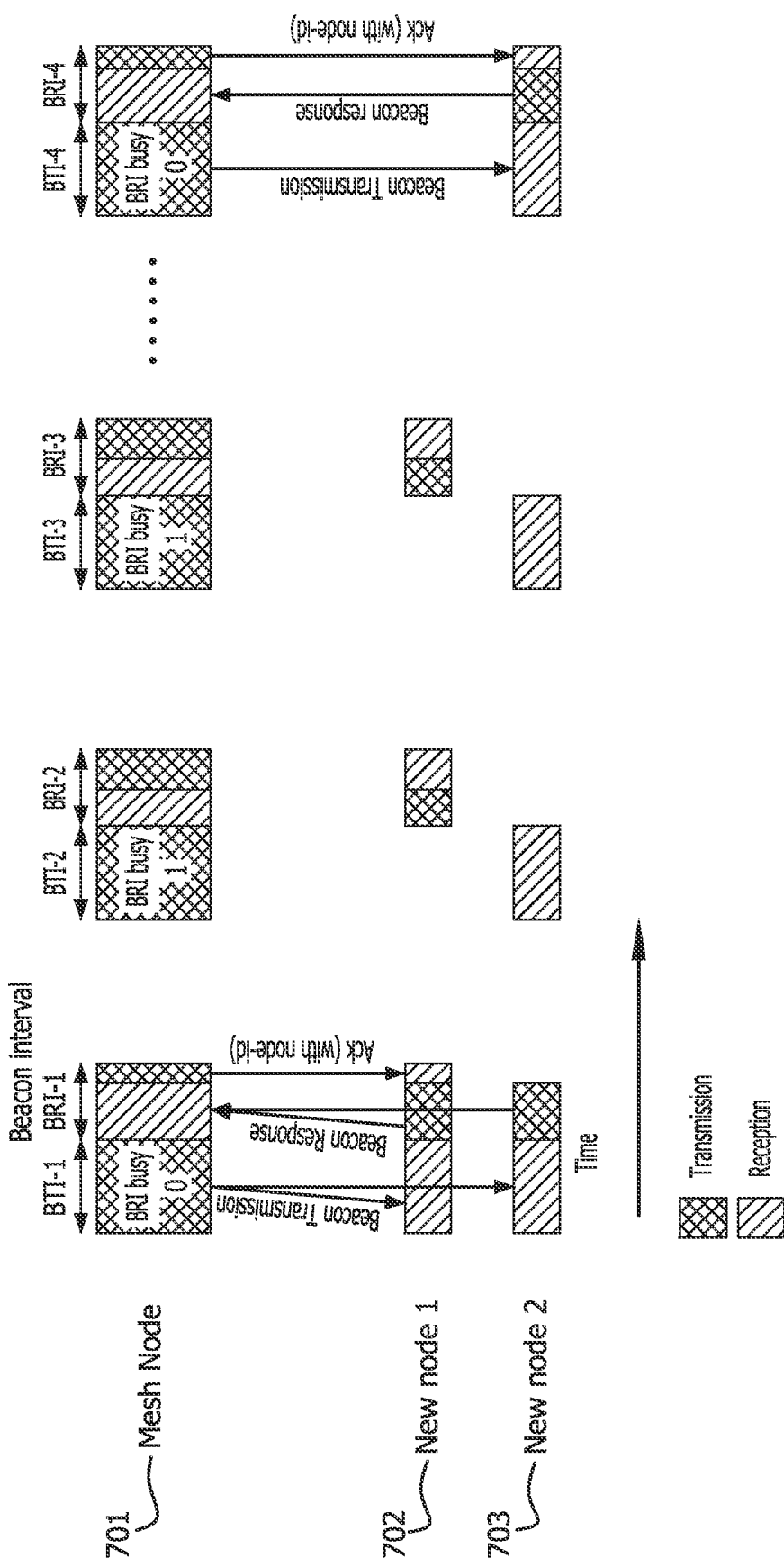
FIG. 7 shows an example of BRI collision detection via BRI reservation.

FIG. 7 shows an example of BRI collision detection via BRI reservation. As shown in FIG. 7, when more than one new node, (new node 1 702 and new node 2 703), receives the beacon at the same time BTI 1 and ends up choosing the same beacon response slot, it may result in BRI collision. In this example, it may be assumed that new node 1's 702 beacon response was successfully decoded by the mesh node 701, but new node 2's 703 beacon response was not. In this example, the new node 1 702 which was successful at transmitting the response back may receive the ACK from the mesh node 701. The mesh node 701 may also reserve the subsequent BRI periods for mesh initialization procedures for new node 1 702. The new node 2 703, whose response was lost due to collision, may infer that the beacon response has lost based on the BRI busy field. When the BRI period is free, which is indicated by the BRI busy field, the new node 2 703 may retry the same beacon response beam. Additionally, the BRI offset field in the beacon message may carry the LSB bits of the new node 1's 702 MAC address. New node 2 703 may now wait for the BRI field to be free again. When the BRI field becomes free again new node 2 703 may perform a random backoff and transmit a beacon response message. Collision may also happen when new node 1 702 and new node 2 703 choose different BRI slots, but in the same BRI period, because the mesh node 701 has a provision to transmit one beacon ACK. A new node may use the same set of rules (random backoff) as the previous example.

A BRI period may also be reserved for purposes other than receiving a beacon response, like interference measurements. The mesh node may reserve the BRI period by setting the BRI reservation field to an appropriate cause code. The mesh node may also use the offset field to indicate the offset in terms of the number of BRI periods after which the BRI may be available for the new node to join.

In situations where the mesh node is no longer able to accept any new node, the BRI reservation field may be set to barred. The mesh node may use the offset field to indicate the reason for barred like load constraints or routing constraints like a max hop count and the like. The new node may exhibit different behaviors for these different cause codes (such as node barred due to load/routing constraints, interference measurements, and the like). For example, the new node may add the mesh node to a barred list and start a node barring timer. On expiry of the timer, the new node may re-acquire the beacon of this mesh node (using stored directional/timing information) and examine the BRI reservation and cause fields again. The timer values may vary according to the cause node (for example, load constraints may have a shorter timer than the topology constraints).

If the nodes in the interference zone perceive interference during association procedures, a control message may be exchanged between the nodes in the interference zone to silence out BRI periods (other than interference periods), to reduce interference for the association procedures.

The new node may check the BTI reservation field before using the BRI period for message exchange. If the BRI field is busy due to interference measurements or if the BRI is barred, the new node may defer transmission during BRI. In another example, the new node may use this idle time to scan for beacons in other receive sectors.

Figure 8B:
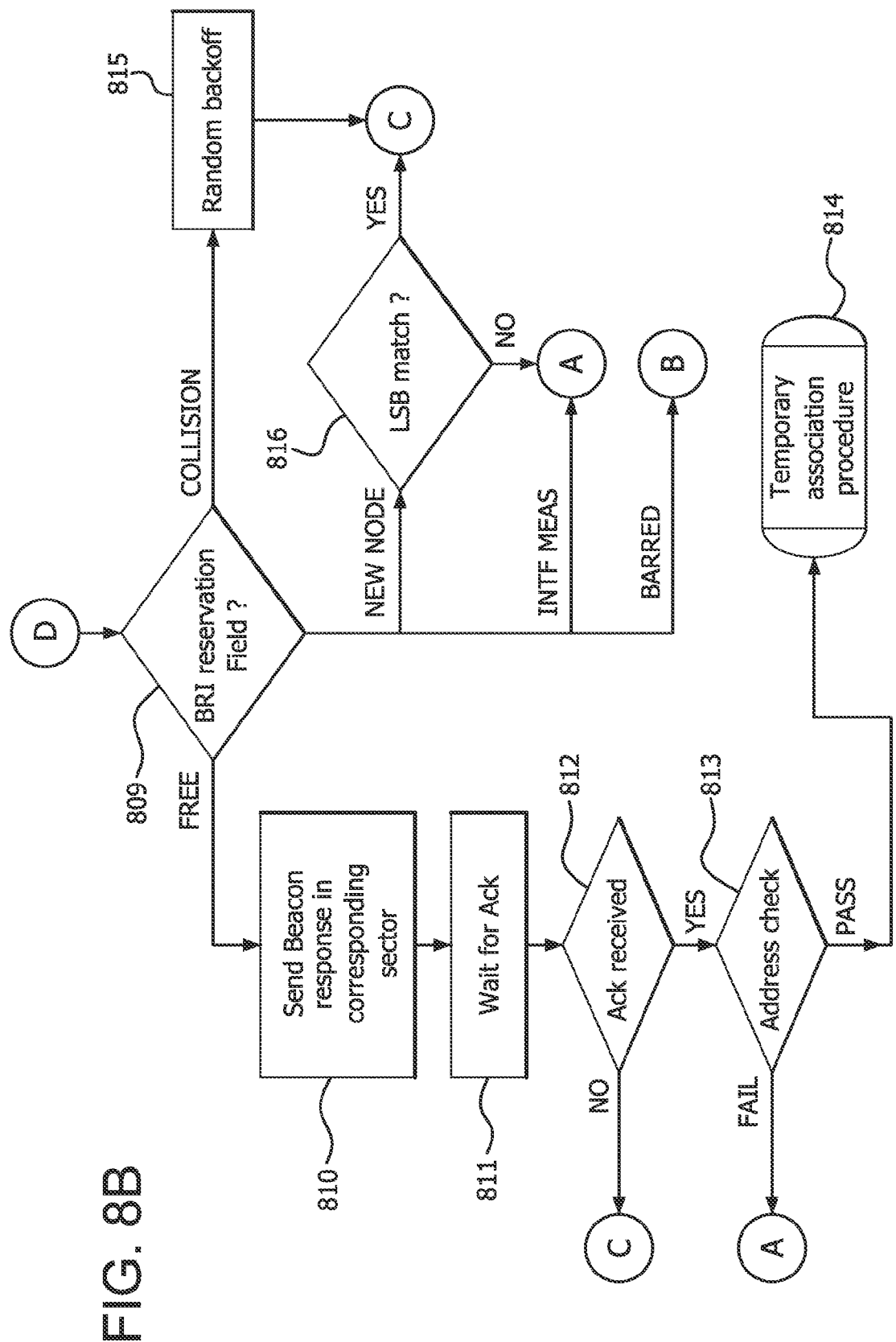

FIGS. 8A and 8B are an example flowchart for a discovery procedure for the new node. In FIGS. 8A and 8B, the discovery procedure (800) begins with the new node choosing a random incomplete sector (801). If all the sectors are complete (802), the discovery procedure ends (803). If not all the sectors are complete (802), the new node waits for a beacon (804). If a time out occurs before a beacon is received, the new node moves to the next sector (805) and then determines if all sectors are complete (802). If the new node receives a beacon, the new node must determine if the beacon SNR>beacon_thresh (808). If the beacon SNR is not greater than the beacon_thresh, the new node moves on to the next sector (805) and once again determines if all sectors are complete (802). If the beacon SNR is greater than the beacon_thresh, the new node looks to see if the beacon has a BRI reservation field (809). If the BRI reservation field is free, the new node sends a beacon response in the corresponding sector (810). The new node waits for an ACK (811). If the ACK is no received, the new node goes back to waiting for a beacon (804). If the ACK is received (812), the new node checks the address (813). If the address check fails, the new node arks the sector incomplete (806) and moves on to the next sector (805). If the address check passes, the new node performs a temporary association procedure (814). If the BRI reservation field contains a collision, the new node performs a random backoff (815) and then waits for a beacon (804). If the BRI reservation field contains a second new node, the new node may perform a least significant bit (LSB) match (816). If the LSB matches, the new node then waits for a beacon (804). If the LSB does not match, the new node marks the sector incomplete (806) and moves to the next sector (805). If the BRI reservation field includes an interference measurement, the new node marks the sector incomplete (806) and moves to the next sector (805). If the BRI reservation field is barred the new node marks the sector complete (807) and moves to the next sector (805).

Figure 9B:
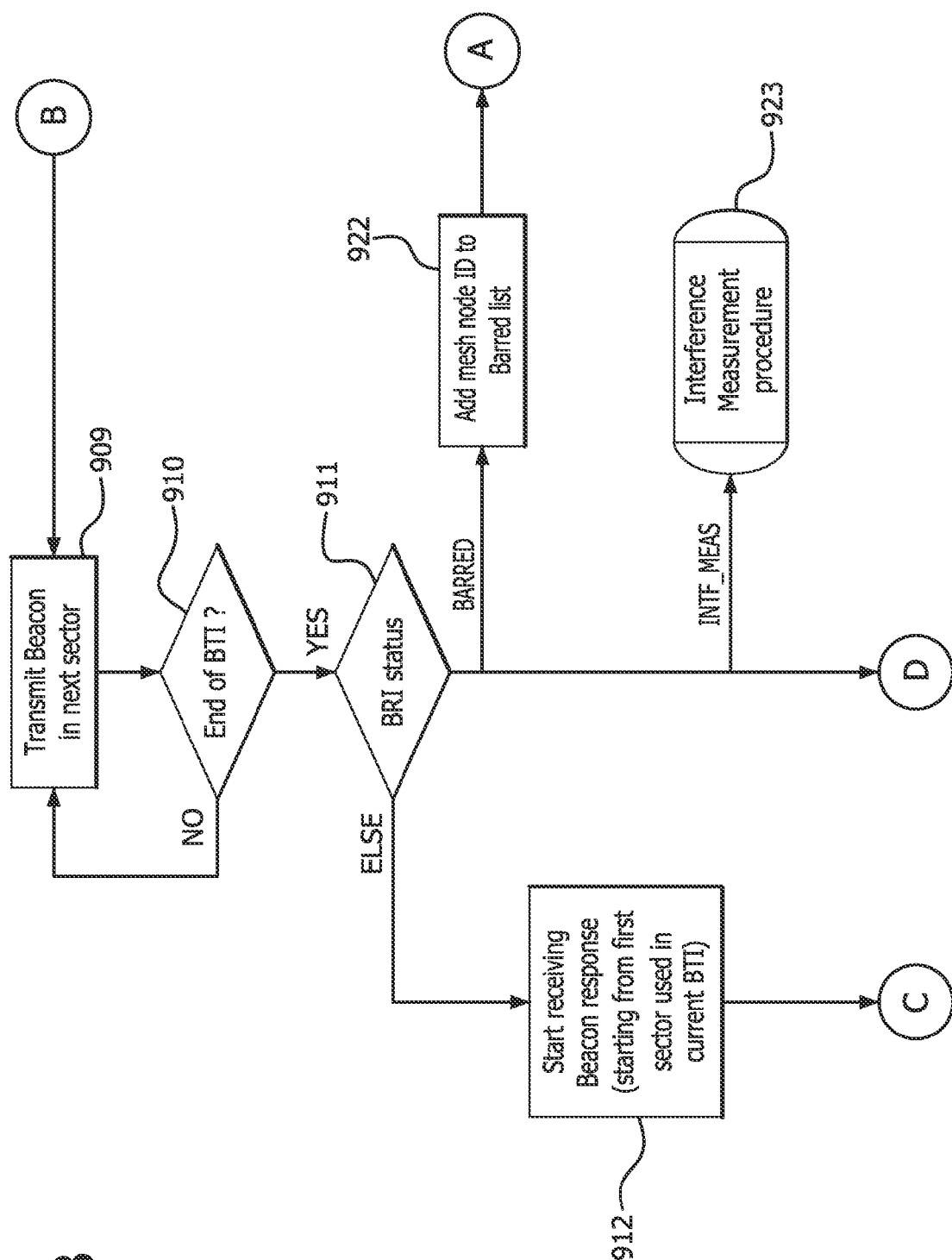
Figure 9C:
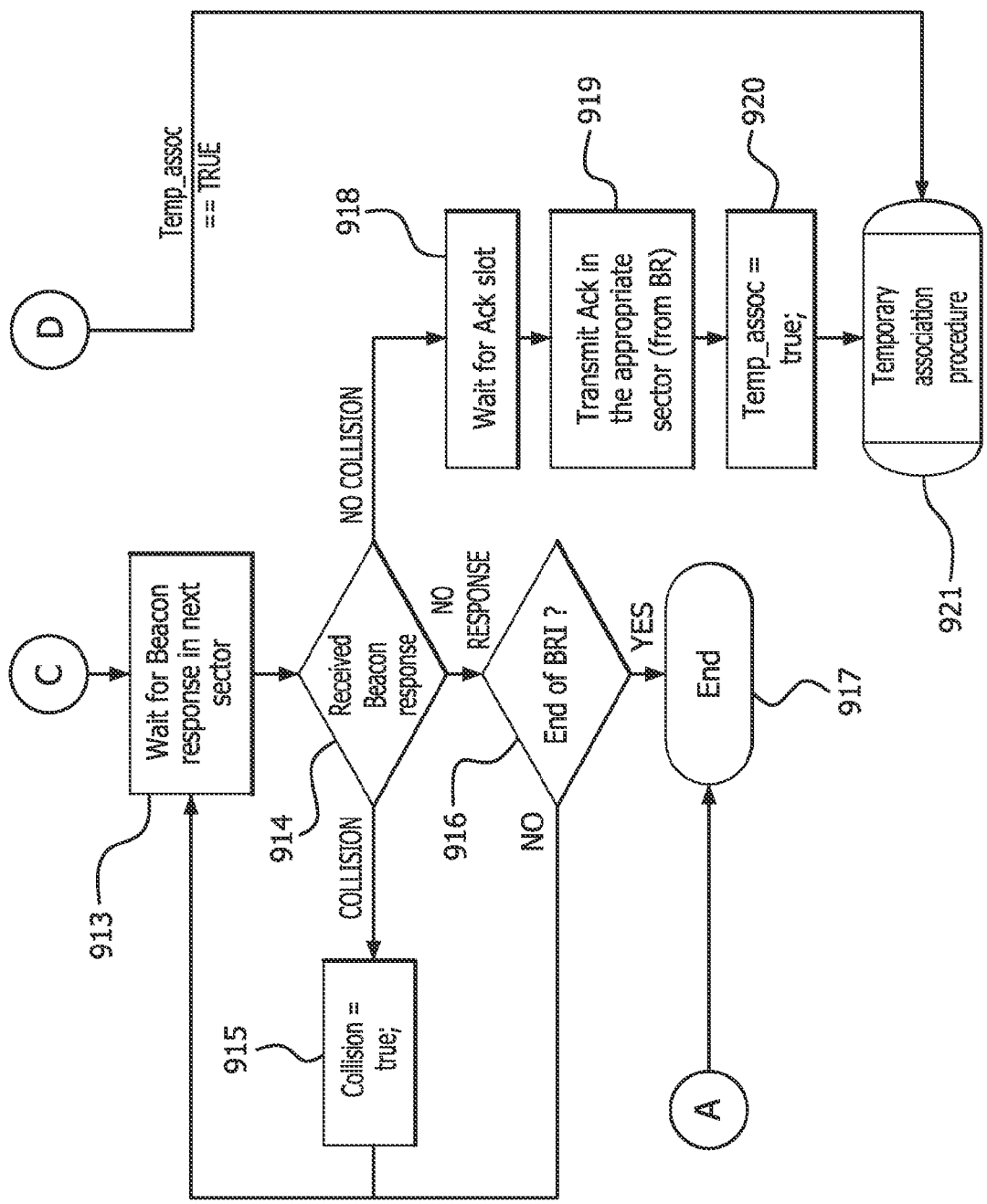

FIGS. 9A-9C are an example flowchart for a beacon procedure for the mesh node. In FIGS. 9A-9C, the beacon procedure (900) begins with the mesh node determining if all transmit sectors are complete (901). If not all the transmit sectors are complete, the mesh node check the BRI status (903). If all the transmit sectors are complete, the mesh node refreshes the transmit sector ordering (902) and then checks BRI status (903). If the BRI status is Temp_assoc==TRUE, a new node is joining and the offset is the LSB of the new node (904). If the BRI status is INTF_MEAS, an interference measurement may be performed and the offset is the next free BRI (905). If the BRI status is Collision==TRUE, a collision may occur and the offset is the next free BRI (906). If the BRI status is BARRED, the BRI is barred and the offset is the next free BRI (907). If the BRI status is ELSE, the BRI is free and the offset is the next free BRI (908). The mesh node then transmits a beacon in the next sector (909). The mesh node determines if this is the end of the BTI (910). If it is not the end of the BTI, the mesh node transmits a beacon in the next sector (909). If it is the end of the BTI, the mesh node checks the BRI status (911). If the BRI status is ELSE, the mesh node starts receiving a beacon response (starting from the first sector used in the current BTI) (912). The mesh node waits for a beacon response in the next sector (913). If a beacon response was received (914) and indicates collision, a collision may occur (915). The mesh node then waits for a beacon response in the next sector (913). If no beacon response was received (914), the mesh node determines if this was the end of the BRI (916). If it was not the end of the BRI, the method node waits for a beacon response in the next sector (913). If it was the end of the beacon response, the beacon procedure is over (917). If a beacon response was received (914) and indicates no collision, the mesh node waits for an ACK slot (918). The mesh node then transmits and ACK in the appropriate sector (919). The ACK includes an indication of Temp_assoc=true (919) and a temporary association procedure begins (921). If the BRI status is BARRED, the ID of the mesh node is added to the barred list (922) and the beacon procedure ends (917). If the BRI status is INTF_meas, an interference measurement procedure begins (923). If the BRI status is Temp_aasoc===True, a temporary association procedure begins (921).

After completion of BRI, the primary node may communicate with the network controller to inform it about the new node's request to join the network. The primary node may transmit a control message to the aggregating node, which may forward it to the network controller, including the new node's MAC identifier. If the controller admits the node, the controller may respond with a (shorter) node identifier that identifies the new node in future communications. The primary node may convey the new node identifier during the setup phase of the fine beam training interval (FBTI) during the next empty beacon slot. Thereafter, the new node may use the node identifier in all subsequent communications with the network nodes, including the beacon response message. The network controller may use the primary node to communicate with the node until final association is completed.

The process for fine beam training and SINR-based beam selection may be split into five phases: fine beam training setup, interference training setup, training (new node tx, primary node tx and neighbor tx (multiple instances)), reporting, and SINR-based beam selection process.

During fine beam training setup, the primary node and the new node may negotiate the number of transmit/receive beams to use during the fine beam training transaction. Fine beam training setup messages may be exchanged between the nodes as follows. The primary node may transmit a message to new node including the new node identifier received from the network controller and the number of fine transmit and receive beams that the primary node may want to try out during the fine beam training transactions. The new node may transmit a message including a request for fine transmit and receive beams that it wants to try out during the fine beam training transactions period. The primary node may transmit another message to the new node either accepting or proposing a new number for the transmit and receive beams at the new node for trials. The primary node may also include the schedule for fine beam training transactions during the present and possibly subsequent empty beacon slots. If more time is required to complete the fine beam training transactions, the remaining time in the present period, starting time at the next available empty beacon slot may be included in the message. The new node may transmit an acknowledge message including the proposed number of trial beams.

During the interference training setup phase, the primary node may prepare the nodes in the interference zone of both the primary node and the new node to participate in the interference measurement process. The primary node may be aware of its own interference zone and the nodes' presence within its interference zone. The primary node may get the information about the interference zone of the new node from the operation, administration, and maintenance (OAM) center. The primary node may calculate the schedule for the interference zone by taking into account the following factors: the number of transmit/receive beams used by the primary node and the new node during fine beam training, the number of neighbors in the interference zone of the primary node and the new node, the maximum number of neighbors allowed for each node (which in turn determines the number of transmit/receive beams used by the neighbor nodes), and the like. Both the fine beam training and the interference training may occur during the BRI period and may take multiple BRI periods (in different beacon intervals) depending on the schedule length. The primary node may set up the schedule such that both the fine beam training and interference training may happen in parallel with the restriction that one node is transmitting at any time within the interference zone.

After the completion of the setup phase, the primary node, the new node, and the neighbor nodes in the interference zone may participate in a combined fine beam training and interference training phase. There are three stages during this phase. The first stage is called a new node tx phase, the second phase is the primary tx phase, and the third phase is the neighbor tx phase.

Figure 10:
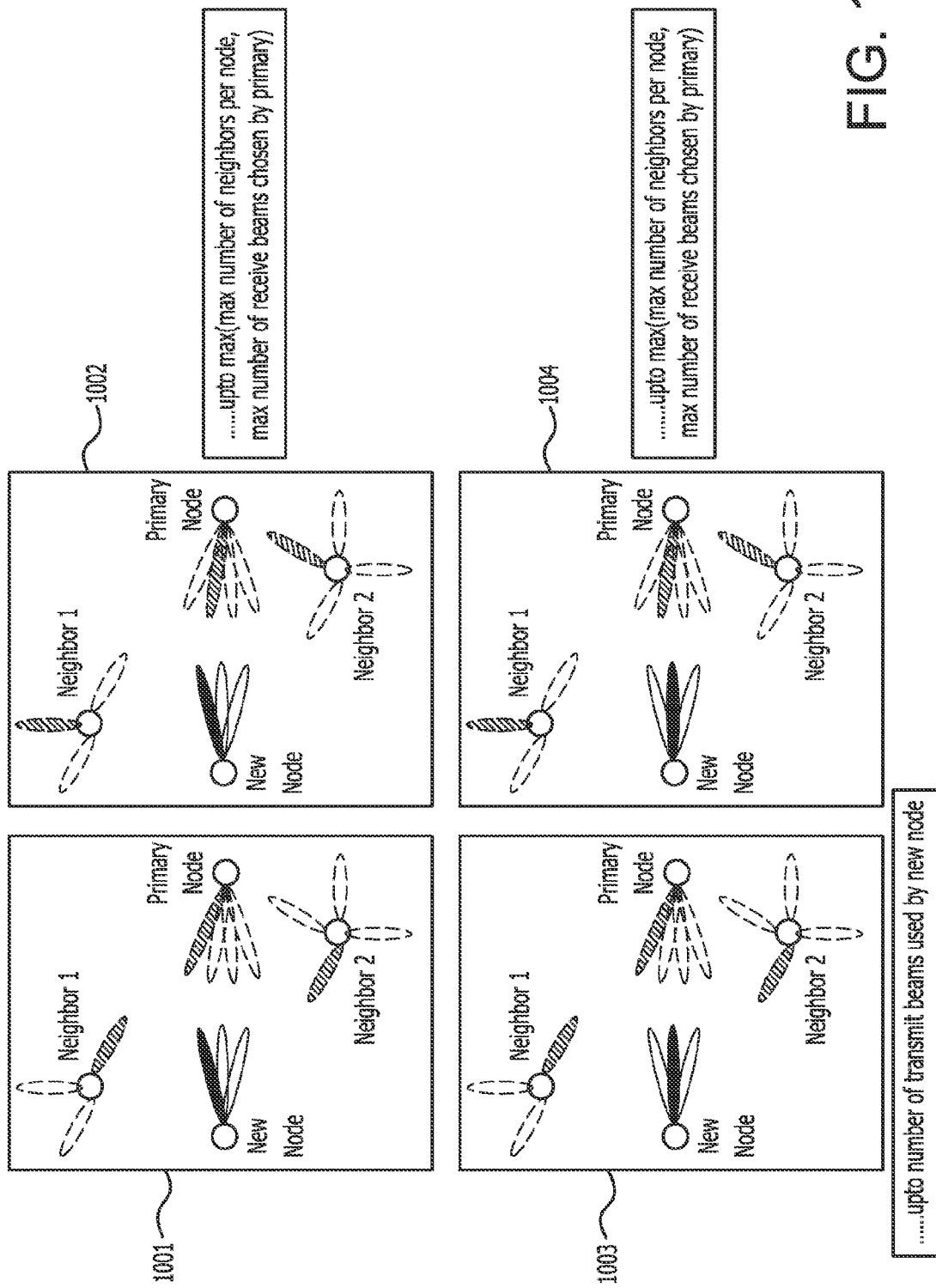
FIG. 10 shows an example of a new node transmit (Tx) phase.

FIG. 10 shows an example of the new node tx phase. In this phase, the new node may transmit the training sequence using one of tx beams. Each tx beam may last for the P slots (where P={max (the maximum number of neighbors per node, the number of receive beams chosen by the primary node)}). Upon completion of P slots, the new node may switch to the next tx beam and so on until it exhausts all the chosen tx beams. For example, in 1001 the new node uses a first tx beam to transmit the training sequence to a first slot. In 1002 the new node uses the first tx beam to transmit the training sequence in a second slot. In 1003 the new node uses a second tx beam to transmit the training sequence in a first slot. In 1004 the new node uses a second tx beam to transmit the training sequence in a second slot.

During this phase, the primary node may sequentially receive the training sequences, switching to a new receive pattern every slot. The neighbor nodes in the interference zone may also switch through their receive beams (one per neighbor direction) and perform the measurements (including the signal power from the new nodes transmission).

Figure 11:
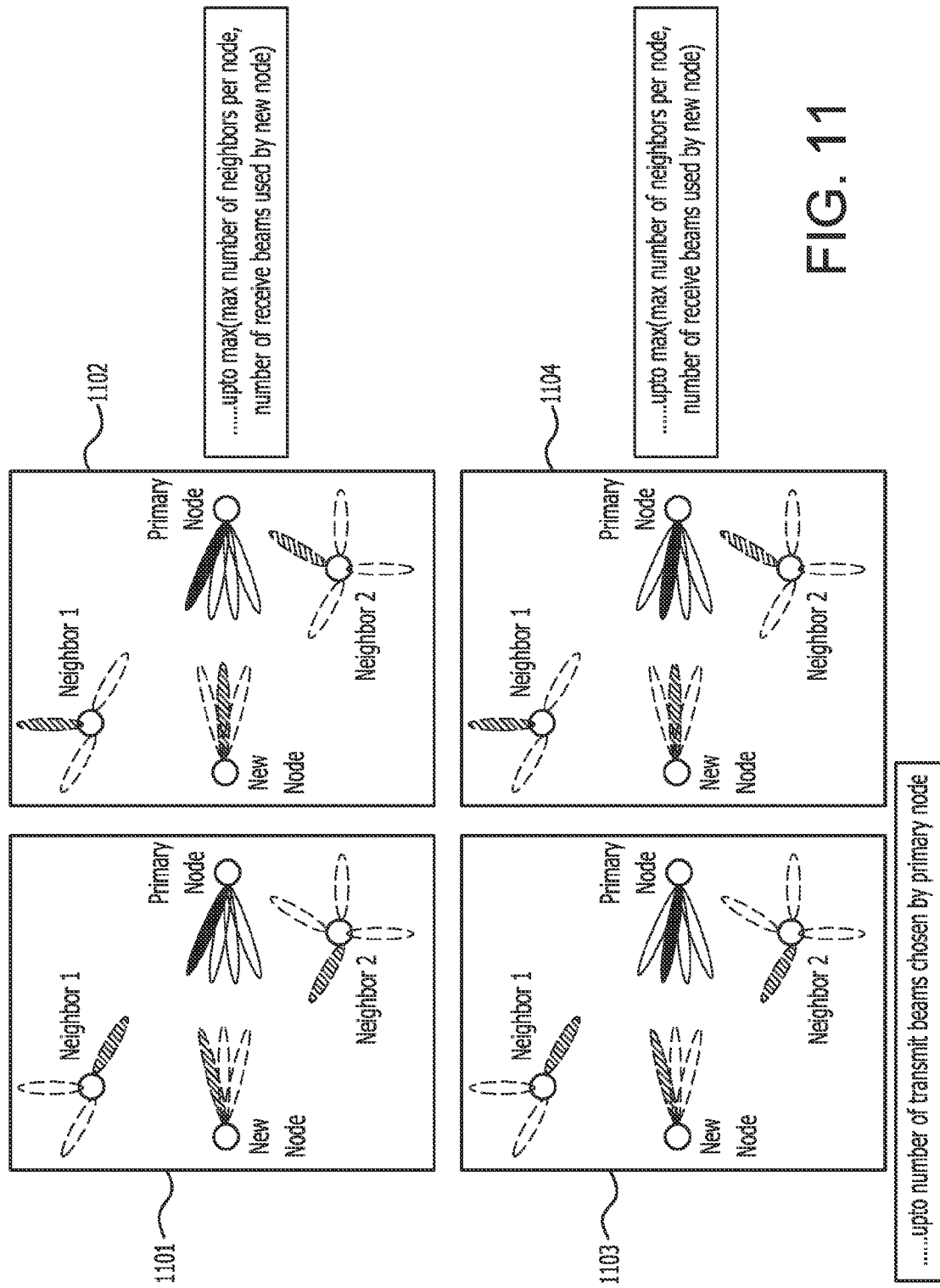
FIG. 11 shows an example of a primary node Tx phase.

FIG. 11 shows an example of the primary node tx phase. In the primary tx phase, the roles of the primary and the new node may be reversed and the measurements may be made again. In this phase, the primary node may transmit the training sequence using one of tx beams. Each tx beam may last for the P slots (where P={max (the maximum number of neighbors per node, the number of receive beams chosen by the primary node)}). Upon completion of P slots, the primary node may switch to the next tx beam and so on until it exhausts all the chosen tx beams. For example, in 1101 the primary node uses a first tx beam to transmit the training sequence in a first slot. In 1102 the primary node uses a first tx beam to transmit the training sequence in a second slot. In 1103 the primary node uses a second tx beam to transmit the training sequence in a first slot. In 1104 the primary node uses a second tx beam to transmit the training sequence in a second slot.

During this phase, the new node may sequentially receive the training sequences, switching to a new receive pattern every slot. The neighbor nodes in the interference zone may also switch through their receive beams (one per neighbor direction) and perform measurements including the signal power from the primary node's transmission.

Figure 12:
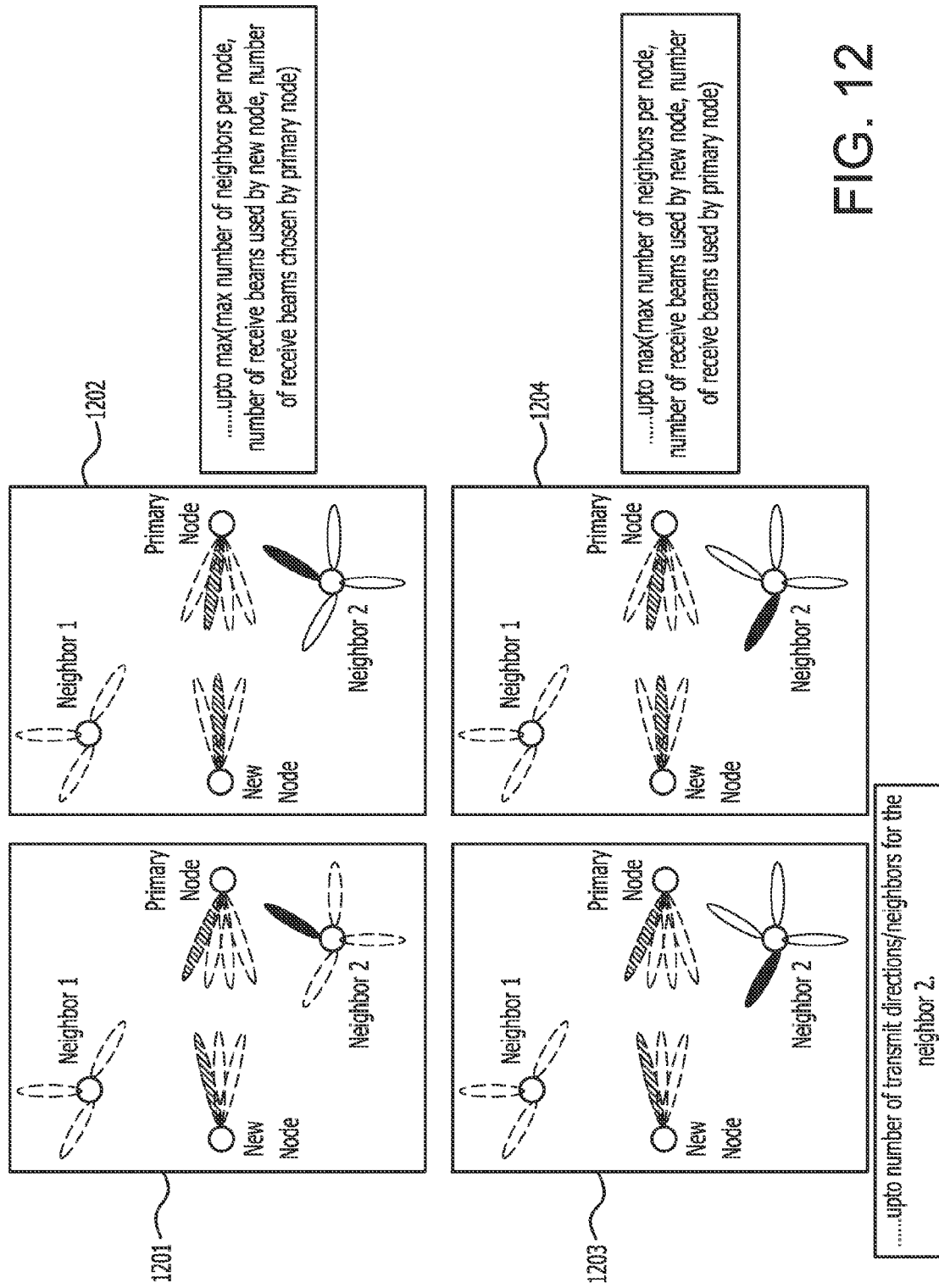
FIG. 12 shows an example of a neighbor Tx phase.
Figure 13A:
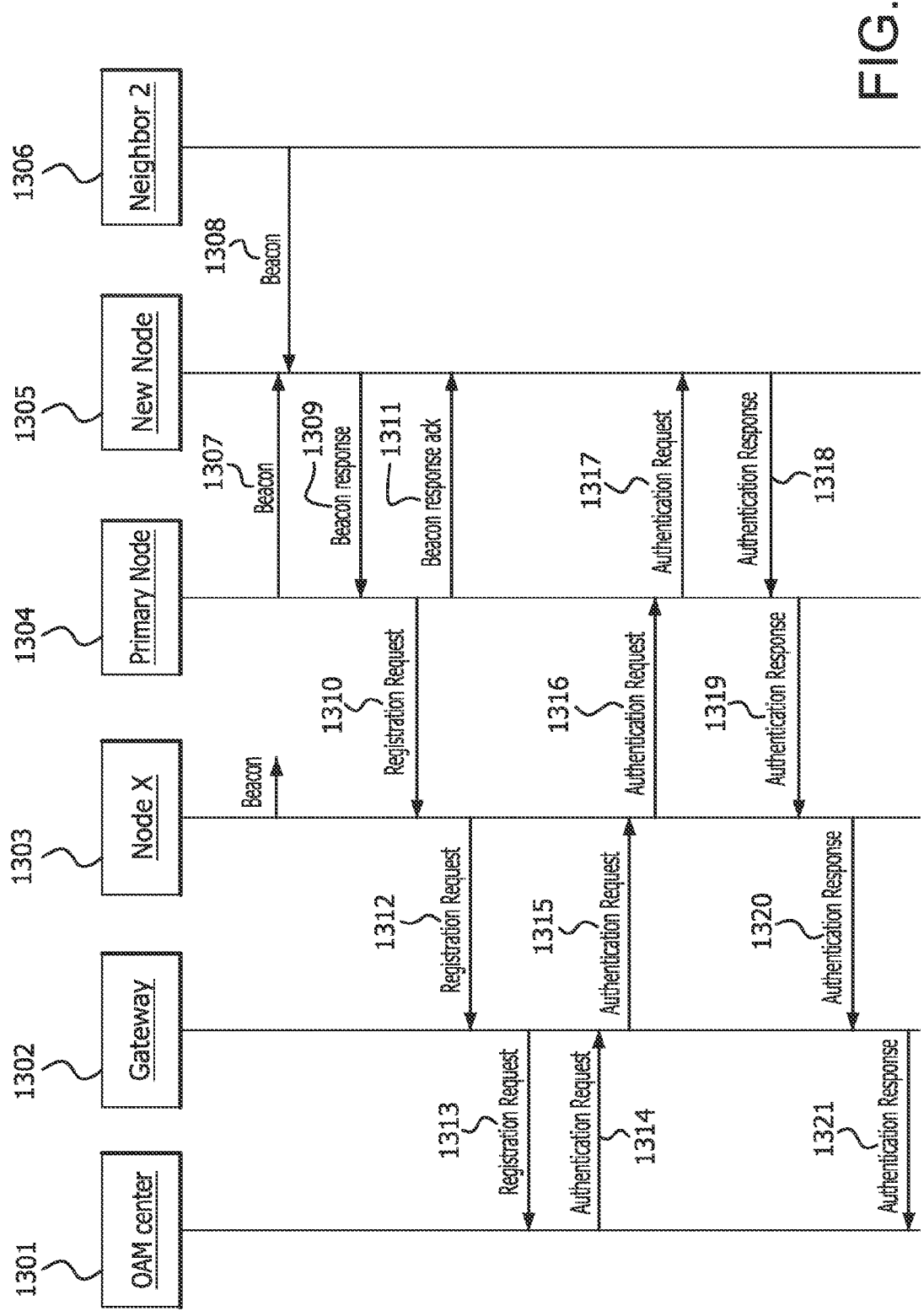
FIGS. 13A-E show a flow diagram of an example node initialization procedure.
Figure 13B:
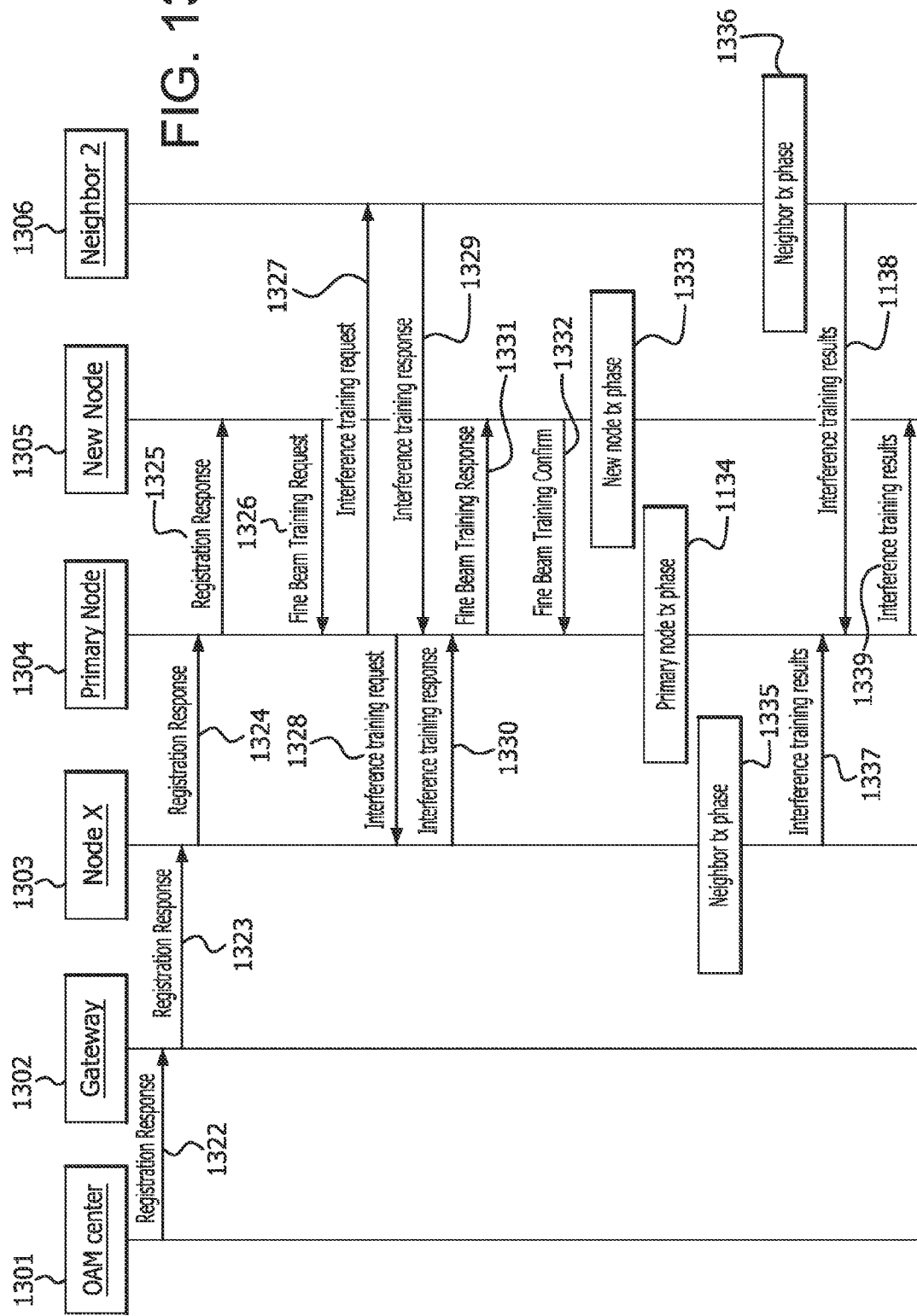
Figure 13C:
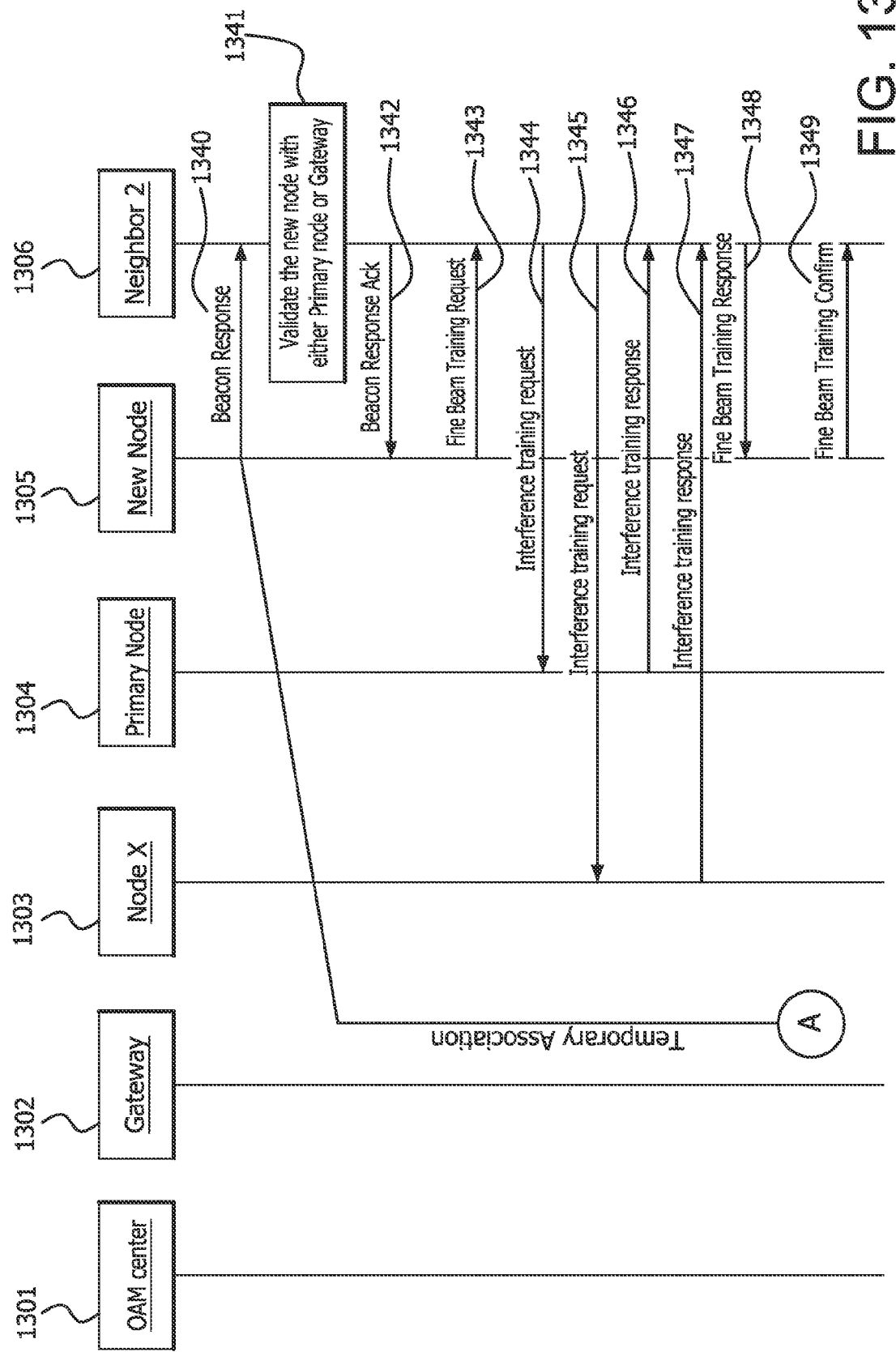
Figure 13D:
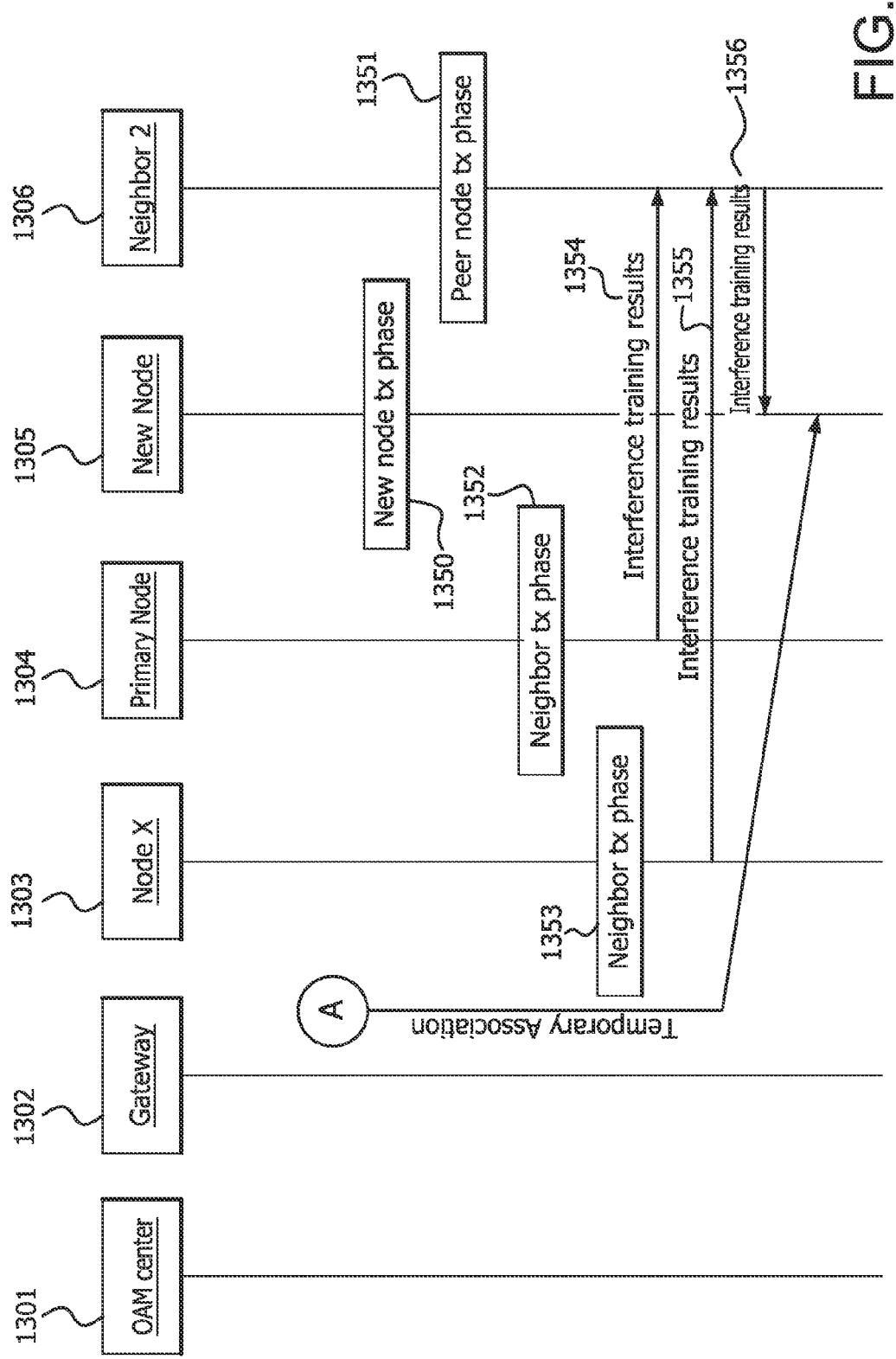
Figure 13E:
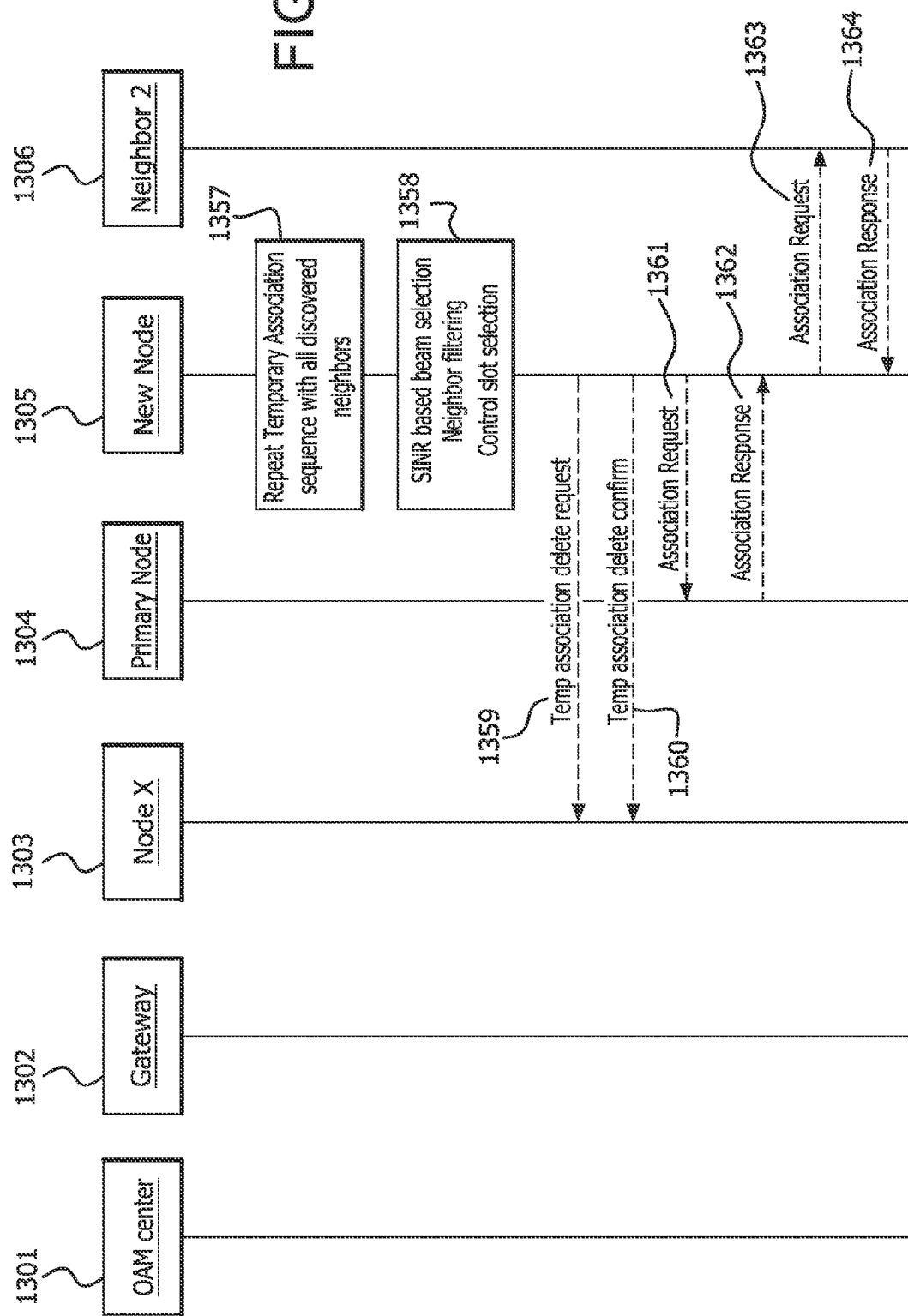

FIG. 12 shows an example of the neighbor tx phase. In this phase, one of the neighbor nodes may cycle through its transmit beam (towards each of its neighbor) for every Q slots. The value for Q may be max(the maximum number of neighbors per node, the number of receive beams used by the primary node, the number of receive beams used by new node). For example, in 1201 neighbor node 2 uses a first x beam to transmit the training sequence in a first slot. In 1202 neighbor node 2 uses a first tx beam to transmit the training sequence in a second slot. In 1203 neighbor node 2 uses a second tx beam to transmit the training sequence in a first slot. In 1204 neighbor node 2 uses a second tx beam transmit the training sequence in a second slot. The whole procedure may be repeated for a 11 other neighbors located in the interference zone.

During this time, both the primary node and the new node may measure the signal power using their receive beams and switch the receive pattern every slot. This phase may capture the effect of existing links in the network (by the neighbor nodes) on the new link that is about to be created between the primary node and the new node.

After completion of the training phase, all the neighbor nodes in the interference zone may provide the results of measurements made, along with the control slot information (which contains the information of both the free and in use control slots). These reports may be transmitted in the data region as a control message. The new node may also transmit the measurement reports to the primary node in the BRI period (for example, using the same beam used to transmit the beacon response frame).

The primary node may choose the receive beam towards the new node, for example, by taking into account the SNR of the received signal from the new node, the interference power received by other nodes, and the like. The primary node may also choose the transmit beam from the new node. The primary node may then transmit the index of the beams and a set of path metrics (which may include the path to the gateway and average path metric for all other destinations) to the new node. The primary node may provide the control slot information of all the neighbor nodes including the primary node to the new node.

In one embodiment, the primary node may choose the transmit and receive beams to be used by the new node towards the primary node and transmit the index of those beams to the new node. In another embodiment, the primary node may collect all the measurement results from the neighbor nodes and append those results with its own measurements and transmit the complete measurement list, along with the control slot information, to the new node. The new node may then choose the receive and transmit beams, for example, taking into account the SINR of the beams and the interference power to the affected neighbor nodes.

To expedite the new node joining process, the new node may perform a background search for neighbor node beacons (for example, during the BTI period). In addition to this, the primary node may provide the neighbor assistance information (for example, the number of possible neighbor nodes, approximate direction of the neighbor node, slot timing information and the like) to the new node.

The new node may repeat the whole fine beam training and SINR-based beam selection process sequentially with all other discovered neighbors. The process is the same as disclosed above, just that the functionality of the primary node is replaced by the neighbor node.

In one embodiment, the results of beam training with the primary node and the neighbor nodes may be transmitted to the OAM center. The OAM center may perform neighbor filtering by taking into account, for example, the network topology, network load, SINR thresholds, backhaul throughput/delay requirements for new node, and choose the neighbor nodes for the new node. The OAM center may decide the control slots that the new node may use for each of its neighbors. In this process, the OAM center may identify the list of potential interferers for the new node and each of the interferers may be notified of this. The OAM center may setup the control slots such that it is possible to exchange schedules on a transmission time interval (TTI) basis to enable time multiplex of conflicting nodes.

The actual SINR base beam selection may be based on a new metric.

In another embodiment, the neighbor selection, the control slot selection, and the interference avoidance mechanism may be performed in a distributed fashion.

After the completion of the fine beam training, the new node may obtain the information necessary to perform neighbor filtering. The new node may choose the neighbors taking into account at least the following factors: SNR of selected beams, interference seen by neighboring nodes, path metric to the gateway, or the like. The new node may choose the best beam towards each of its neighbors that may cause the least interference to others and may result in best path metric to the gateway. The nodes may be restricted to have minimum 2 and maximum N neighbors, where N may be configured by the gateway/OAM. This restriction may ensure that the control regions are kept relatively shorter to achieve better MAC efficiency at the same time allowing for some path diversity and reliability in case of link failures. The new node may choose the top (<N) candidates as the neighbors and filter out the rest.

The new node may choose a dedicated control slot for each of the selected neighbor nodes. The control slots may be chosen such that the control slot is not already used by the neighbor nodes (the node towards which the control slot may be used) and potential interfering nodes identified during the interference training are not using the same control slot in the same interfering direction.

If such a control slot cannot be found, the new node may either chose another beam for this peer node, choose prefer a next neighbor, or drop the link. In one embodiment, there may be separate beams for control and data. By the end of this process, the new node may have a list of neighbors and the control slots for each of the chosen neighbor.

After the neighbor filtering and control slot selection, the final association may take place. The new node may perform an association procedure with each of the selected nodes in the BRI period. The association request message may carry among other information: the control slot to use, transmit/receive beams to use, and the like. The new node may inform the neighbor nodes that are not selected via a control message in the BRI period. Once the final association procedure is complete, the new node and the all of its neighbors may switch to the fine beam in the chosen control slot. During the final association procedure, the new node may inform the potential interferers to the primary/neighbor node so that the new node and the interferers agree on the interference management mechanism. The interference management may either be localized or coordinated. Some of the localized mechanisms are power control, modulation and coding scheme (MCS) change, time/frequency multiplexing (reserving specific parts of data region), randomization of data scheduling or dropping the link altogether. Some examples of coordinated mechanisms are TTI-based time multiplexing or frequency multiplexing. The coordinated approach may involve explicit signaling exchange between the new node and the interfering nodes.

FIGS. 13A-13E show a flow diagram of an example node initialization procedure. A primary node 1304 may transmit a beacon (1307) to a new node 1305. The beacon may include a beacon count, a network ID, a timestamp, next empty beacon, and a quality metric primary node ID. A neighbor node, for example neighbor 2 1306 may also transmit a beacon (1308) to the new node 1305. The beacon may include a beacon count, a network ID, a timestamp, next empty beacon, and a quality metric neighbor 2 node ID. The new node 1305 may transmit a beacon response (1309) to the primary node 1304. The beacon response may include a primary ID, a new node MAC address, discovered neighbor node IDS, capability information, location information, and a registration request. The primary node 1304 may transmit a registration request (1310) to a node X 1303. The registration request may include a primary node ID, a new node MAC address, capability information, and location information. The primary node 1304 may transmit a beacon response ACK (1311) to the new node 1305. The beacon response ACK may include a primary node ID, a new node MAC address, and next empty beacon. The node X 1303 may forward the registration request (1312) to the gateway 1302. The gateway may forward the registration request (1313) to the OAM center 1301. The OAM center may transmit an authentication request (1314) to the gateway 1302. The authentication request may include a primary node ID, a new node MAC address, an algorithm ID, challenge vectors, and the like. The gateway 1302 may forward the authentication request (1315) to the node X 1303. The node X 1303 may forward the authentication request (1316) to the primary node 1304. The primary node may forward the authentication request (1317) to the new node 1305.

The new node 1305 may transmit an authentication response (1318) to the primary node 1304. The authentication response may include a primary node ID, a new node MAC address, and a challenge response. The primary node 1304 may forward the authentication response (1319) to the node X 1303. The node X 1303 may forward the authentication response (1320) to the gateway 1302. The gateway 1302 may forward the authentication response (1321) to the OAM center 1301. The OAM center 1301 may transmit a registration response (1322) to the gateway 1302. The registration response may include a primary node ID, a new node MAC address, a new node ID, configuration parameters, neighbor information, and the like. The gateway 1302 may forward the registration response (1323) to the node X 1303. The node X 1304 may forward the registration response (1324) to the primary node 1304. The primary node 1304 may forward the registration response (1325) to the new node 1305; which may additionally include fine beam training setup. The new node 1305 may transmit a fine beam training request (1326) to the primary node 1304. The fine beam training request may include a primary node ID, a new node ID, and transmit and receive beam configurations. The primary node 1304 may transmit an interference training request (1327) to neighbor 2 1306. The interference training request may include a training sequence configuration, a new node MAC address, and scheduling information. The primary node 1304 may also transmit an interference training request (1328) to the node X 1303. Neighbor 2 1306 may transmit an interference response (1329) to the primary node 1304. The node X 1303 may also transmit an interference response (1330) to the primary node 1304.

The primary node 1304 may transmit a fine beam training response (1331) to the new node 1305. The fine beaming training response may include a primary node ID, a new node ID, transmit and receive beam configurations, scheduling information, and an interference training configuration. The new node 1305 may transmit a fine beam training confirmation (1332) to the primary node 1304. The new node 1305 may perform a new node tx phase (1333). The primary node 1304 may perform a primary node tx phase (1334). The node X 1303 may perform a neighbor tx phase (1335). Neighbor 2 1306 may perform a neighbor tx phase (1336). The node X 1303 may transmit interference training results (1337) to the primary node 1304. The interference training results may include measurement results and control slot configuration. Neighbor 2 1306 may also transmit interference training results (1338) to the primary node 1304. The primary node 1304 may forward the interference training results (1339) to the new node 1305.

During temporary association, the new node 1305 may transmit a beacon response (1340) to neighbor 2 1306. The beacon response may include a neighbor 2 ID, a new node ID, discovered neighbor node IDs, capability information, location information, and a primary node ID. Neighbor 2 1306 may validate a new node (1341) with either the primary node 1304 or the gateway 1302. Neighbor 2 1306 may transmit a beacon response ACK (1342) to the new node 1305. The beacon response ACK may include a neighbor 2 ID, a new node ID, next empty beacon, and fine beam training setup. The new node 1305 may transmit a fine beam training request (1343) to neighbor 2 1306. The fine beam training request may include a neighbor 2 ID, a new node ID, and transmit and receive beam configurations. Neighbor 2 1306 may transmit an interference training request (1344) to the primary node 1304. The interference training request may include a training sequence configuration, a new node MAC address, and scheduling information. Neighbor 2 1306 may also transmit an interference training request (1345) to the node X 1303. The primary node 1304 may transmit an interference training response (1346) to neighbor 2 1306. The node X 1303 may also transmit an interference training response (1347) to neighbor 2 1306. Neighbor 2 may transmit a fine beam training response (1348) to the new node 1305. The fine beam training response may include a neighbor 2 ID, a new node ID, transmit and receive beam configurations, scheduling information, and an interference training configuration. The new node 1305 may transmit a fine beam training confirmation (1349) to neighbor 2 1306.

The new node 1305 may perform a new node tx phase (1350). Neighbor 2 1306 may perform a peer node tx phase (1351). The primary node 1304 may perform a neighbor tx phase (1352). The node X 1303 may perform a neighbor tx phase (1353). The primary node 1304 may transmit interference training results (1354) to neighbor 2 1306. The interference training results may include measurement results and a control slot configuration. The node X 1303 may also transmit interference training results (1355) to neighbor 2 1306. Neighbor 2 1306 may forward the interference training results (1356) to the new node 1305. The new node 1305 may repeat the temporary association procedure with all discovered neighbors (1357). The new node 1305 may perform SINR based beam selection, neighbor filtering, and control slot selection (1358). The new node 1305 may transmit a temporary association delete request (1359) to the node X 1303. The new node 1305 may also transmit a temporary association delete confirmation (1360) to the node X 1303. The new node 1350 may transmit an association request (1361) to the primary node 1304. The association request may include a primary ID, a new node ID, tx/rx beam ID, and control slot. The primary node 1304 may transmit an association response (1362) to the new node 1305. The association response may include a primary ID and a new node ID. The new node 1305 may transmit an association request (1363) to neighbor 2 1306. This association request may include a neighbor 2 ID, a new node ID, tx/rx beam ID, and control slot. Neighbor 2 1306 may transmit an association response (1364) to the new node 1305. This association response may include a neighbor 2 ID and a new node ID.

The mesh architecture may be flat with two node types: a regular mesh node and an aggregation node (also called gateway). The aggregation node may serve as a termination point for the mesh network and may be connected to the core network (for example, LTE core network) via a high-rate wired or wireless network. Additionally, like a regular mesh node, the aggregation node may generate local access traffic. There may be multiple aggregation points in the network and each node may be connected to multiple aggregation points. There may be relay nodes required to complete the topology or to achieve the minimum connectivity requirements. Functionality of the relay nodes may be same as mesh node, but the relay node may not generate own/local traffic.

Mesh network formation may be initiated when an aggregation point is energized. The aggregation point may first connect to a network controller/OAM center via its associated IP network to retrieve network configuration parameters. The network configuration parameters include, but are not limited to, network identifier, node identifier, back-end IP connection capacity, operating frequency bands, any special regulatory constraints, node connectivity limit and scheduling interval duration, supported service classes (for example, QoS) and their associated parameters (such as latency limits), and the like. Any required software/firmware updates may also be performed at this time before mesh formation.

After initialization and retrieving configuration parameters from the network controller/OAM center, the aggregation node may start transmitting out beacons. The network controller/OAM center may provide the timing reference for the beacon start time to the aggregation point. This may be the same timing reference provided by the OAM center to all the aggregation points in the mesh network. The OAM center may thus ensure that all the aggregation points in the mesh network are synchronized. Since all the aggregation points are synchronized, a mesh node may be connected to two aggregation points, or connected to two different mesh nodes that are connected to two different aggregation points.

Once the aggregation point is completely initialized, it may start scanning for beacons for possible mesh nodes (non-aggregation points). If the aggregation point detects existing nodes belonging to the same network, it may transmit a special control message in the BRI period to inform the mesh node about the new aggregation point. The mesh node may then perform association with the aggregation point similar to mesh initialization procedure.

Upon successfully completing the association procedure with any existing neighboring mesh nodes, or upon scanning for beacons for a pre-determined period and not receiving any, the aggregation node may start beacon transmission to enable other nodes to join the mesh network. When a new node is energized, it may start scanning for beacon transmissions according to the procedure disclosed above in a pre-configured frequency band. If after some pre-determined time has elapsed without any beacon reception, the new node may switch to other frequency bands according to a pre-determined format to scan for beacons containing its own network identifier. When the new node receives a beacon frame with the required network identifier, it may start an association procedure. The received beacon frame may have been transmitted either by a regular node or an aggregation node. Upon successful association and route and schedule setup, the new node may retrieve system parameters from the OAM center and perform any software/firmware updates, as required, before initiating user data transmission.

A two phase association and the SINR based beam selection procedures may be described herein. Exemplary algorithms for neighbor selection and SINR-based beam selection may also be provided.

A new node may perform a temporary association with each of the discovered mesh nodes. At the end of the discovery procedure, the new node may receive a beacon response ACK with the offset field to the next free BRI. The new node may perform a temporary association procedure using that BRI resource. Temporary association may implicitly reserve the resources during the BRI period, so that the new node may communicate with the peer mesh node. This reservation of the BRI period may prevent the collision due to beacon responses that may be transmitted by other new nodes in the network. Temporary association may also create a temporary context of the new node in the peer mesh node and vice versa. Once the context is created in the peer mesh node, a new node may perform the following procedures using the peer mesh node: 1) Registration (with OAM center), if the mesh node is a primary node (first mesh node that the new node associates with); 2) Authentication procedure (local authentication with mesh node and Remote authentication with OAM center); and 3) Beam forming/training and interference measurements.

The association between the new node and the mesh node may be temporary because the new node may choose only a subset of neighbors that it discovered initially. The new node may use a neighbor selection algorithm to select the candidate nodes. The neighbor selection algorithm may take into account a lot of factors like SINR of each link, load on the mesh node, path metric to the gateway, control slot availability, and the like. Final association may be made with the neighbors that are selected during neighbor selection procedure. Temporary association with the nodes that are down selected during the neighbor selection procedure may be deleted.

Temporary association may be initiated by the new node during the discovery procedure, when the new node receives a beacon response ACK from a mesh node. The beacon response ACK frame may also carry the offset to the next BRI duration in the BRI offset field. The new node may trigger the temporary association request message in the BRI period indicated by the BRI offset. The new node may include its MAC address along with its capability information field (for example, MCS support, HARQ support, beamforming capability, number of Tx/Rx antennas, security capability, and the like).

A temporary association request may also carry parameters for beam training procedure. For example, the new node may add the number of Tx/Rx beams it wishes to use during the beam training procedure. This may be required at the peer mesh node to schedule for beam training and interference measurement procedure.

If the mesh node is the first node discovered by new node, then the new node may request the mesh node to be a primary node. This may be indicated in the primary request field in a temporary association request message.

The new node also includes the location information (if available) and list of discovered neighbors in the temporary association request message, so that the mesh node may provide assistance information for further discovery (like list of neighbors, beam ID, timing, and the like).

When the peer mesh node receives the temporary association request message, it may check for the local authentication option. Local authentication may be an optional security feature and may be enabled/disabled per node by the gateway/OAM center as per operator policy. The local authentication procedure may be enabled by default unless it is overridden by the OAM center. In case the local authentication procedure is enabled, the peer mesh node may start local authentication procedure by transmitting a local authentication request message to the new node. Local authentication procedure may refer to the peer to peer authentication performed between the new node and the peer mesh node without involving a AAA server or OAM center. This may be based on an SAE authentication protocol defined in 802.11 standards. The new node may also derive the ciphering/integrity protection keys during the local authentication procedure. The security keys may be link specific/neighbor specific because local authentication is performed for each link.

Local authentication may use the BRI periods for message exchange. The local authentication request message may be transmitted in the same BRI in which temporary association request message was received.

When the local authentication response received from the new node is verified, the peer mesh node may transmit the temporary association response message. The temporary association response may carry the capabilities of the peer node (MCS support, beamforming capability, HARQ support and the like). Additionally, the temporary association response may carry the list of free control slots available at the peer node (until the temporary association is updated, the peer mesh node may reserve all of the free control slots to this new node). The temporary association response message may also carry mesh system level parameters/constants/timers (like bandwidth, node connectivity limit, and the like).

The following example shows the timeline for the temporary association procedure in units of BRI period. The temporary association may be triggered at the BRI specified by the beacon ACK in the discovery procedure. Both the temporary association request and the local authentication request may be exchanged within one BRI period. The local authentication response and temporary association response message exchange may be completed within the next BRI period.

Figure 14:
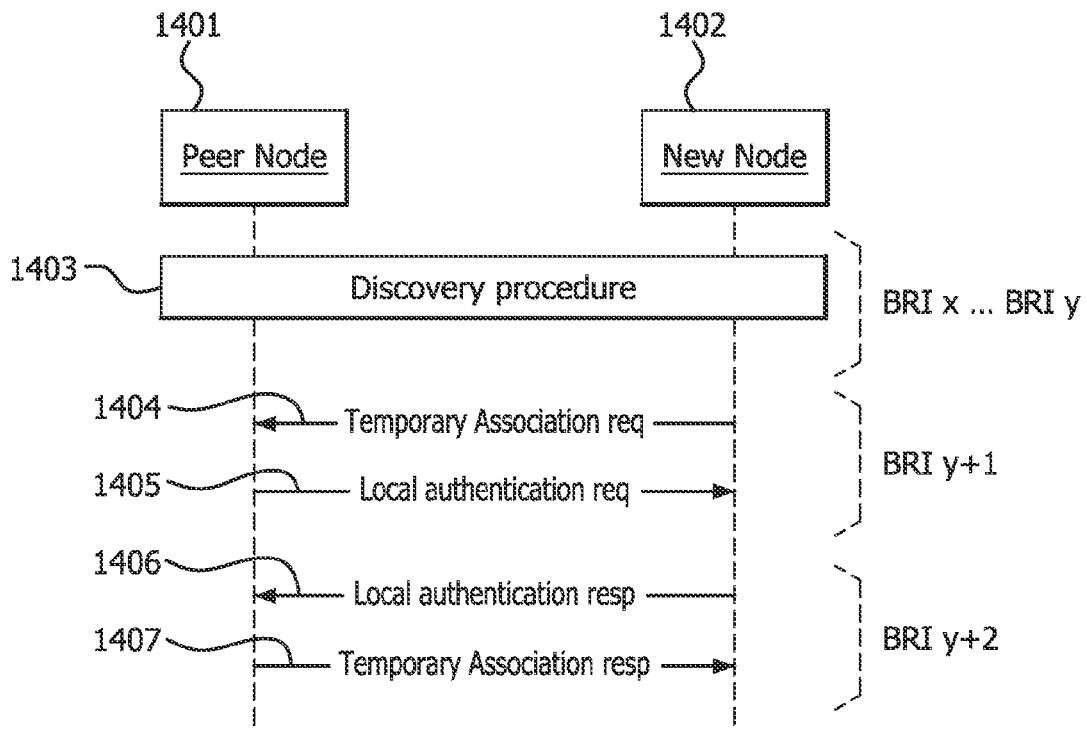
FIG. 14 shows an example of temporary association between a peer node and a new node (with authentication)

FIG. 14 shows an example of temporary association between a peer node and a new node (with authentication). The peer node 1401 and the new node 1402 may perform a discovery procedure (1403) with one another. The new node 1402 may transmit a temporary association request (1404) to the peer node 1401. The peer node 1401 may transmit a local authentication request (1405) to the new node 1402. The new node 1405 may transmit a local authentication response (1406) to the peer node 1402. The peer node 1402 may transmit a temporary association response (1407) to the new node.

Figure 15:
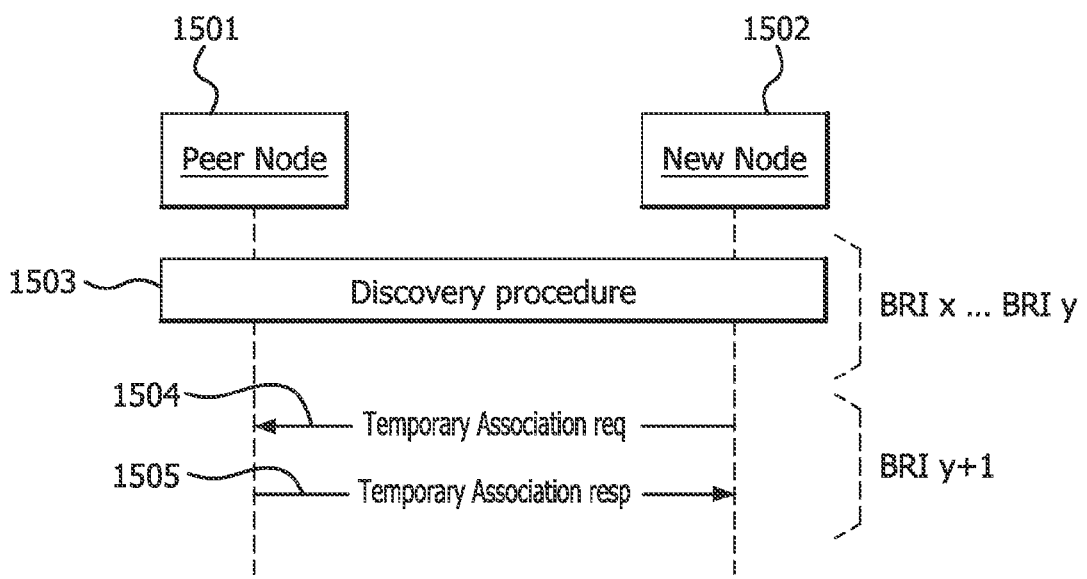
FIG. 15 shows an example of temporary association between a peer node and a new node (without authentication)

In the case where the local authentication procedure is not enabled, the peer mesh node may respond with the temporary association response message in the same BRI period where the request was received. FIG. 15 captures the scenario where the local authentication is disabled, both the temporary association/response message exchange are performed within the same BRI period.

FIG. 15 shows an example of temporary association between a peer node and a new node (without authentication). The peer node 1501 and the new node 1502 perform a discovery procedure (1503) with one another. The new node 1502 may transmit a temporary association request (1504) to the peer node 1501. The peer node may transmit a temporary association response (1505) to the new node 1502.

If the temporary association request message did not carry the registration request, then the mesh node may prepare for the fine beam training measurements schedule. An offset to the BRI period that carries the schedule may be indicated in the temporary association response.

If the temporary association request message had a primary node req field set, then the peer mesh node may trigger the registration procedure towards the OAM center and indicate the BRI offset when the registration procedure is carried out to the new node in the temporary association response message.

Figure 16:
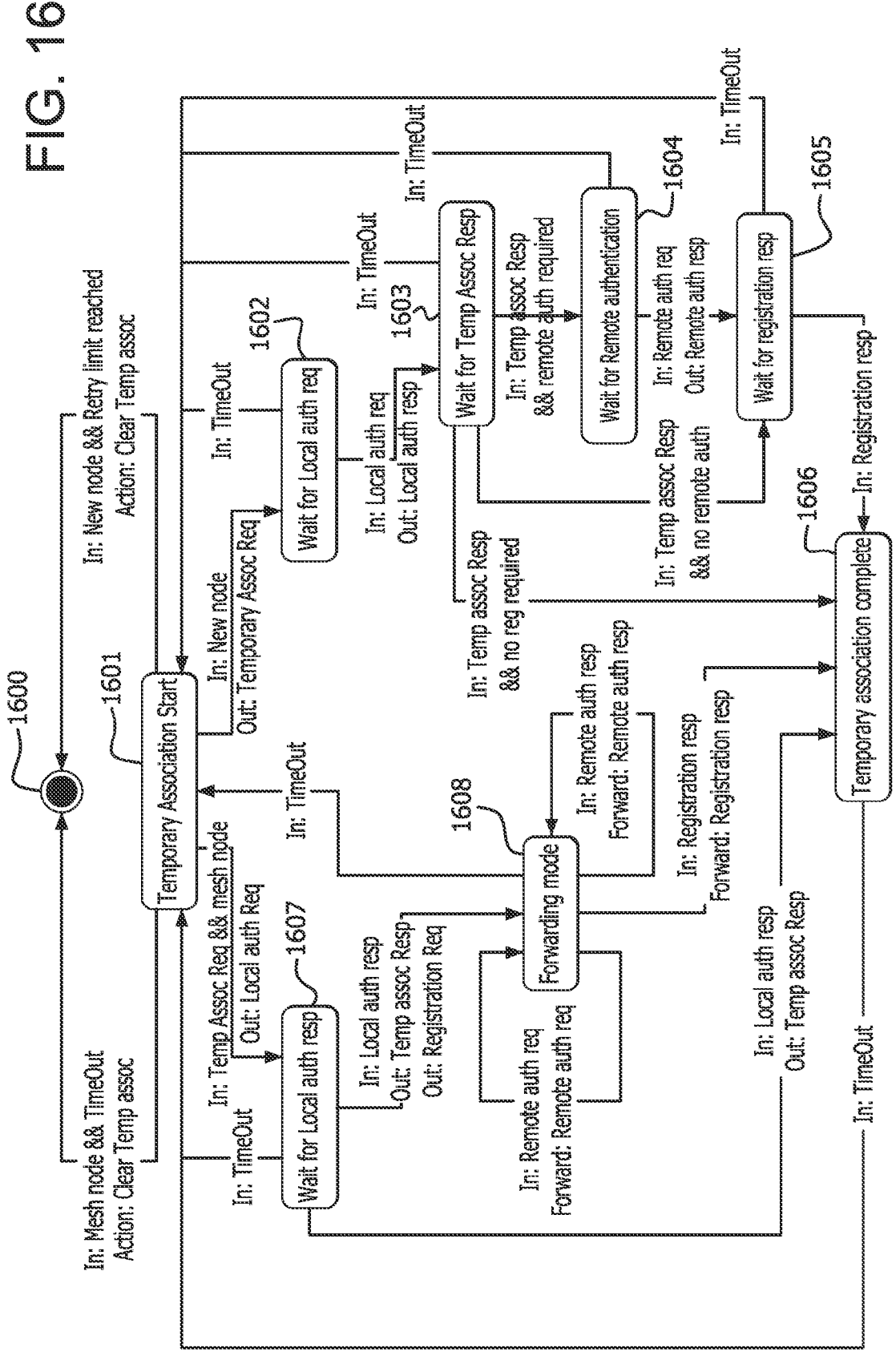
FIG. 16 shows an example of a temporary association state machine.

A finite state machine model for the temporary association procedure including error cases is illustrated in FIG. 16. The state machine covers both the mesh node and new node's procedure.

FIG. 16 shows an example of a temporary association state machine. A mesh node and a new node may start temporary association (1601). The new node may transmit a temporary association request and wait for a local authorization request (1602). If the new node times out while waiting for the local authorization request, temporary association (1601) may start again. If the new node receives a local authorization request, it may transmit a local authorization response and wait for a temporary association response (1603). If the new node times out while waiting for the temporary association response, temporary association (1601) may start again. If the new node receives a temporary association response and no registration is required, temporary association is complete (1606). If the new node receives a temporary association response and no remote authorization is required, the new node waits for a registration response (1605). If the new node receives a registration response, temporary association is complete (1606). If the new node times out while waiting for the registration response, temporary association (1601) may start again. If the new node receives a temporary association response and remote authorization is required, the new node may wait for a remote authentication (1604). If the new node times out while waiting for the remote authentication, temporary association (1601) may start again. If the new node receives the remote authorization request, it may transmit a remote authorization response and wait for a registration response (1605).

The mesh node, having received a temporary association request, may transmit a local authorization request and wait for a local authorization response (1607). If the mesh node times out while waiting for the location authorization response, temporary association (1601) may start again. If the mesh node receives the local authorization response, it may transmit a temporary association response and a registration request and transition to a forwarding mode (1608). If the mesh node receives the local authorization response and transmits a temporary association response, temporary association is complete (1606). If the mesh node times out in the forward mode, temporary association (1601) may start again. If the mesh node receives a remote authorization request, it may forward the remote authorization request and transition to the forwarding mode (1608). If the mesh node receives a remote authorization response, it may forward the remote authorization response and transition to the forwarding mode (1608). If the mesh node receives a registration response, it may forward the registration response, temporary association is complete (1606).

If temporary association is completed (1606) and the mesh node or the new node time out, temporary association (1601) may start again. If the mesh node and the new node time out prior to the start of temporary association (1601), temporary association is cleared (1600).

Registration may enable the new node to exchange messages with the OAM center. This may provide a centralized control to an otherwise distributed nature of the mesh backhaul. A registration procedure may be enabled by default unless it is overridden by operator policy. A mesh node may trigger the registration procedure, if the primary node request field set in the temporary association request message transmitted by the new node is true. The primary node may wait until the local authentication is successful before triggering the registration procedure. The gateway node may also perform a registration procedure as soon as it is powered on.

The registration request may be addressed to the OAM center. In one example, the gateway node may keep track of the OAM center IP, so that the new node may include a special node ID (for example, 255) and the gateway node may translate any packet addressed with this special node ID to an actual OAM IP address.

After the discovery procedure, the new node may transmit a temporary association request with the primary node request field as true. The peer mesh node may trigger the local authentication as before and, once the local authentication is successful, the primary node may trigger registration towards the OAM center if the registration procedure is enabled as per operator policy. The peer mesh node may form the registration request message by copying the contents from the received temporary association request message. These contents may include the new node capability, location information, new node mac address, and the like.

The temporary association response message may indicate to the new node that a registration procedure is ongoing, and may also carry an offset to the BRI resource where the registration/remote authentication messages may be exchanged with the new node.

On receiving the registration request message, the OAM center may trigger the remote authentication procedure. This remote authentication may be used in addition to the local authentication procedure which is performed with each neighbor node. The remote authentication may use the services from the AAA server that may be co-located with the OAM center.

The registration procedure may enable centralized control of the mesh operation to some extent. For example the OAM center may provide neighbor assistance information, by providing the white list of node IDs. The OAM center may also forbid the new node from choosing some of the neighbor node IDs via neighbor black list IDs. This may enable OAM center to perform topology control of the mesh network.

As a part of the registration procedure, the OAM center may assign a short node identifier to the new node. This short node ID may be used to identify the new node in all subsequent communications after the registration procedure. The short node ID (~1 byte) may be used instead of the MAC address (6 bytes) to save space in the MAC header. This short node ID may also be used to address the new node for routing/forwarding operation.

The OAM center may also configure the QoS related parameters like number of QoS classes supported and configuration of each QoS class (for example, latency, jitter, MBR/GBR requirements, routing path metric requirements, and the like).

The interference measurement procedure for mesh backhaul may be performed both periodically and event based. The OAM center may configure the periodic interference measurement schedule. In addition, the registration procedure with OAM center may provide the new node with a list of nodes in the interference zone of the new node. This may be a static configuration, which may be calculated just based on the new node location, and may be independent of the neighbor selection by the new node.

The registration procedure may create a charging interface to the policy and charging function. This may be particularly useful in the scenario where the backhaul services are provided by a third party operator who is different from the operator providing the access service. It may also be applicable in the case where the same backhaul service is shared between multiple operators.

The registration may also be used to create a logging/tracing/monitoring interface at the OAM center. This interface may be used for centralized fault/performance monitoring and collecting statistics from the backhaul mesh nodes.

Registration response may also carry system configuration parameters/constants and the like.

The configuration parameters in the registration response may take precedence over the parameters in temporary association response.

Figure 17:
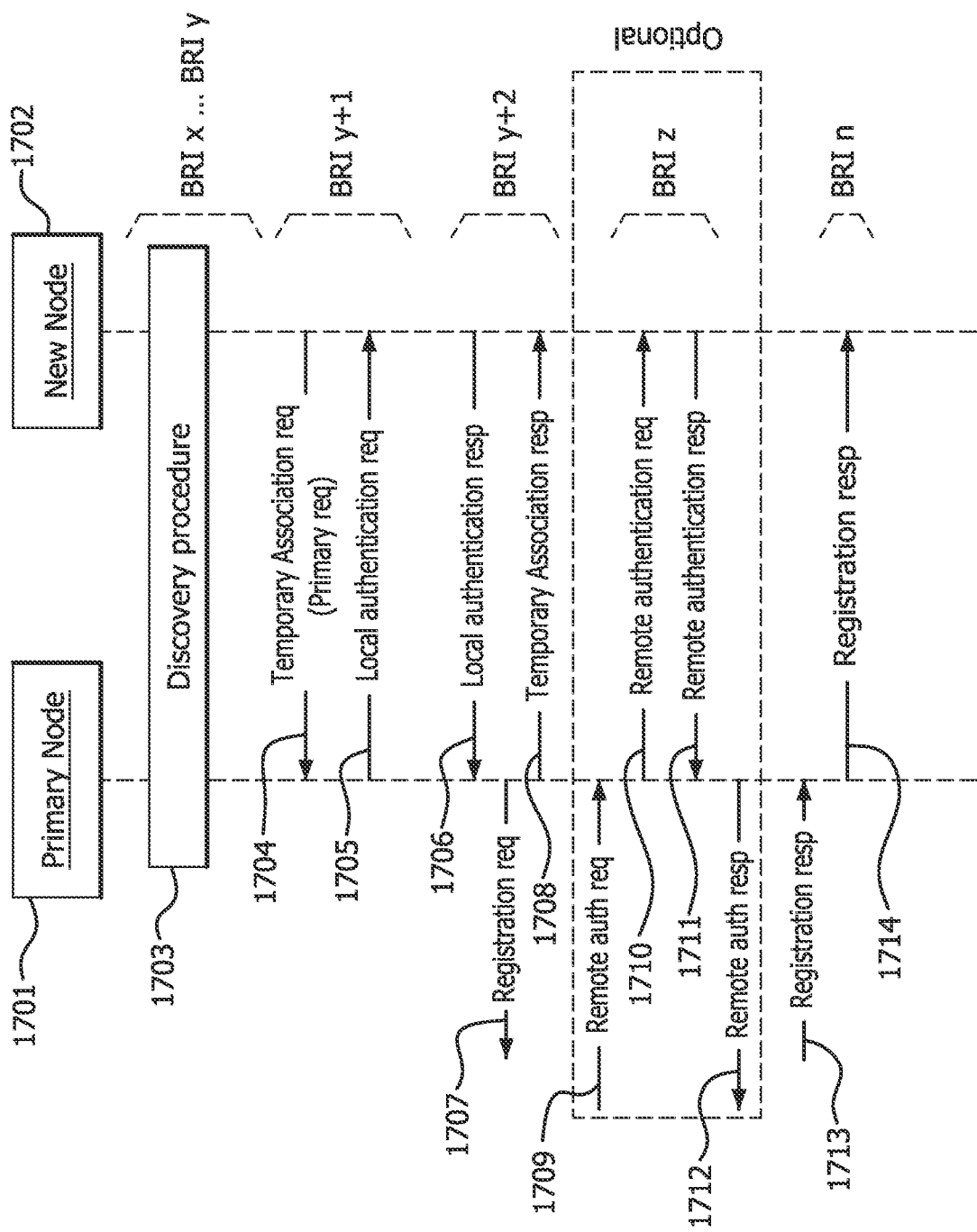
FIG. 17 shows an example of a registration procedure.

FIG. 17 shows an example of a registration procedure. The primary node 1701 and the new node 1702 may perform a discovery procedure (1703) with one another. The new node 1702 may transmit a temporary association request (a primary request) (1704) to the primary node 1701. The primary node 1701 may transmit a local authentication request (1705) to the new node 1702. The new node 1702 may transmit a local authentication response (1706) to the primary node 1701. The primary node 1701 may transmit a registration request (1707). The primary node 1701 may transmit a temporary association response (1708) to the new node 1702. The primary node 1701 may receive a remote authorization request (1709). The primary node 1701 may forward the remote authorization request (1710) to the new node 1702. The new node 1702 may transmit a remote authentication response (1711) to the primary node 1701. The primary node 1701 may forward the remote authorization response (1712). The primary node 1702 may receive a registration response (1713). The primary node 1702 may forward the registration response (1714) to the new node 1702.

As it can be seen, the temporary association and local authentication may be done within 2 BRI periods. The messages to the gateway may be transmitted only in data periods so any interaction to the OAM center may take an additional BRI period. From the peer mesh node perspective, the messages remote auth req/resp, registration resp may be forwarded transparently to and from the new node.

Figure 18:
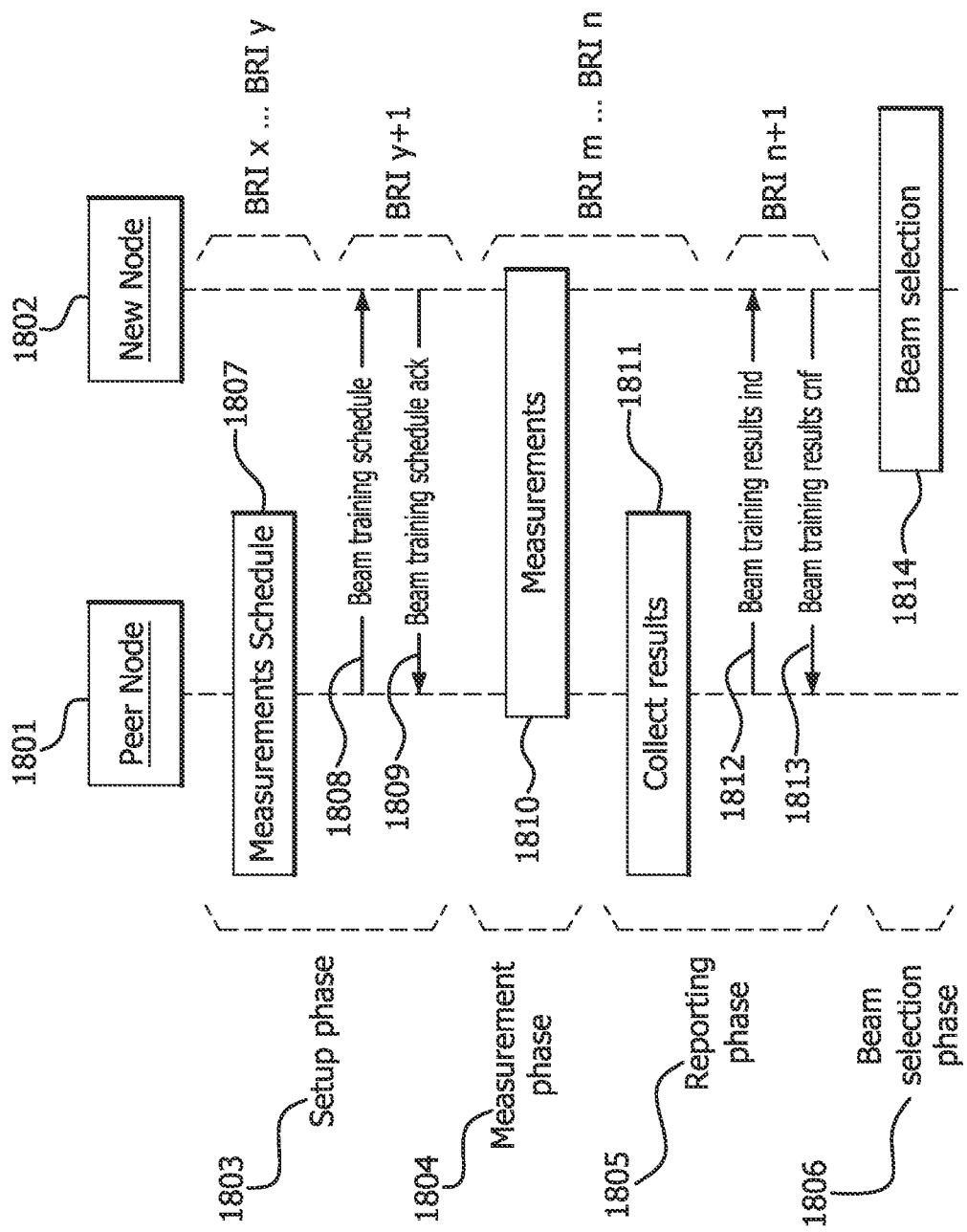
FIG. 18 shows an example of a fine beam training procedure.

FIG. 18 shows an example of a fine beam training procedure. In a setup phase (1803), the peer node 1801 may setup a measurements schedule (1807). The peer node 1801 may transmit a beam training schedule (1808) to the new node 1802. The new node 1802 may transmit a beam training schedule ACK (1809) to the peer node 1801. In a measurements phase (1804), the peer node 1801 and the new node 1802 perform measurements (1810). In a reporting phase (1805), the peer node 1801 may collect the measurement results (1811). The peer node 1801 may transmit beam training results indication (ind) (1812) to the new node 1802. The new node 1802 may transmit beam training results confirmation (cnf) (1813) to the peer node 1801. In the beam selection phase (1806), the new node 1802 may perform beam selection (1814).

Fine beam training is a process in which a new node trains its Rx and Tx beams with its peer mesh node and improves its Tx antenna configuration and Rx antenna configuration using iterative procedure. In a mesh network it may be important not only to optimize the Rx/Tx beams between two communicating nodes, but also to consider the interference caused by the new link on the existing links in the mesh network. The outcome of the fine beam training procedure is that the peer mesh node may choose a set of Rx and Tx beams that the new node may use for communication with the mesh node. The peer mesh node also chooses its own Tx and Rx beam to communicate with the new node. The beam selection may be made based on received signal power and the calculated interference metric. The interference metric may be composed of two parts, the first part is the interference on the new link due to existing links in the mesh network and the second part is the interference caused by the new link to the existing links. This beam selection procedure may be referred to as SINR based beam selection procedure. The fine beam training and SINR based beam selection procedure may be performed for each candidate neighbor discovered by the new node during the discovery procedure.

Fine beam training procedure is composed of 4 phases: Setup phase, Measurement phase, Reporting phase and Beam selection phase. The setup phase has two steps, fine beam training setup and interference training setup.

Fine beam training setup may allow the new node to exchange beam refinement capability information with the peer mesh node and setup schedule for the fine beam training procedure. During the fine beam training setup, the peer mesh node and the new node may negotiate the number of transmit/receive beams to use during the fine beam training transaction. The fine beam training setup procedure may be piggybacked with the temporary association signaling.

The interference measurement procedure may happen in parallel to the beam refinement procedure. Since the interference measurement is performed by all of the nodes in the interference zone, a separate interference training setup procedure may be defined. The interference training setup procedure may schedule the mesh nodes in the interference zone of the new node and peer mesh node to perform measurements. The interference zone of the new node may be derived using the location information provided by the new node as a part of the temporary association procedure. The discovered neighbor list info provided by the new node may also be used to derive the interference zone of the new node. The peer mesh node may also derive the interference zone, based on its knowledge of the local topology. If the registration procedure is performed before the fine beam training procedure, then the OAM center may also provide the interference zone of the new node (in terms of node IDs in the interference zone). The peer mesh node may calculate the schedule for the interference zone by taking into account the following factors: number of transmit/receive beams used by peer mesh and the new node during fine beam training, number of neighbors in the interference zone of both peer mesh node and new node, maximum number of neighbors allowed for each node (which in turn determines the number of transmit/receive beams used by neighbor nodes). Both the fine beam training and the interference training may happen only during the BRI period and may take multiple BRI periods (in different beacon intervals)

depending on the schedule length. The peer mesh node may set up the schedule such that both the fine beam training and interference training happen in parallel; with the restriction that only one node may be transmitting at any time within the interference zone.

The peer mesh node may negotiate the schedule with other mesh nodes in the interference zone. In effect the peer mesh node may reserve the BRI periods of the other mesh node for interference measurement purposes. The fine beam training schedule may then be provided to the new node in the temporary association response message.

The measurement phase may start according to the schedule setup by the peer mesh node. During the measurement phase, the peer mesh node, new node and the neighbor nodes in the interference zone may participate in a combined fine beam training and interference training phase. The measurement phase is split into three stages: new node Tx, peer node Tx and one or more instances of neighbor Tx step in sequence.

In new node Tx stage, the new node may transmit a fine beam training sequence using one of the Tx beams. Each Tx beam may last for the P slots (where P={max (max number of neighbors per node, number of receive beams chosen by the peer mesh node)}). Upon completion of P slots, the new node may switch to the next Tx beam and so on until it exhausts all of the chosen Tx beams. During this phase, the peer mesh node may sequentially receive the training sequences, switching to a new receive pattern every slot until it measures using all its chosen Rx beams. Also the neighbor nodes in the interference zone may switch through their receive beams (one per neighbor direction) and calculate the signal power from new nodes transmission.

After the new node Tx stage is complete, the peer mesh node Tx stage may begin, where the roles of peer mesh node and the new node are reversed and the measurements may be made at the new node and the neighbor nodes again. This time the new node may cycle through all its Tx beams and the peer node may measure each Tx beam with all its chosen Rx beams. In the neighbor Tx stage one of the neighbor node may cycle through its transmit beam (towards each of its neighbor) for every Q slots. The value is Q may be the max(max number of neighbors per node, number of receive beams used by the peer mesh node, number of receive beams used by new node). During this time both the peer mesh node and the new node may measure the signal power using their receive beams and switching the pattern every slot. Neighbor Tx phase may then be repeated for all of the mesh nodes in the interference zone, sequentially as scheduled by the peer mesh node during the interference setup phase. The neighbor nodes may transmit using the beams that are already in use with each of its active neighbors. Also the order in which the neighbor node transmits to its neighbors may be same as the order of control slots in use.

During the reporting phase, the mesh nodes in the interference zone may provide the results of the measurements to the peer mesh node. These measurement results may be piggy backed with the data frames or scheduled separately as control messages in the data region. The peer node may wait for the measurement results from all of the mesh nodes which were scheduled during the interference training setup phase. The peer mesh node may collect all of the measurement results received from the neighbor mesh nodes and append its own measurement results before transmitting it to the new node, using the same beam used to transmit temporary association/registration messages.

The new node may now choose the preferred receive beam towards the peer mesh node by taking into account the SNR of the received signal from peer mesh node, the interference power received by other nodes, and the like. It may similarly choose the transmit beam towards the peer mesh node. The new node may then transmit the index of preferred beams and set of path metrics (which may include the path to gateway and average path metric for all other destinations) to the peer mesh node.

In one example, the results of beam training with the peer mesh node and the neighbor nodes may be transmitted to the OAM center. The OAM center may perform neighbor filtering by taking into account the network topology, network load, SINR thresholds, backhaul throughput/delay requirements for new node The OAM center may then choose the neighbor nodes for the new node. The OAM center may also decide which control slots the new node may use for each of its neighbors. In this process the OAM center may also identify the list of potential interferers for the new node and each of the interferers may be notified of this. The OAM center may also setup the control slots such that it is possible to exchange schedules on a TTI basis to enable time multiplex of conflicting nodes.

In another example, the neighbor selection, control slot selection and the interference avoidance mechanism may be performed in a distributed fashion.

Figure 19A:
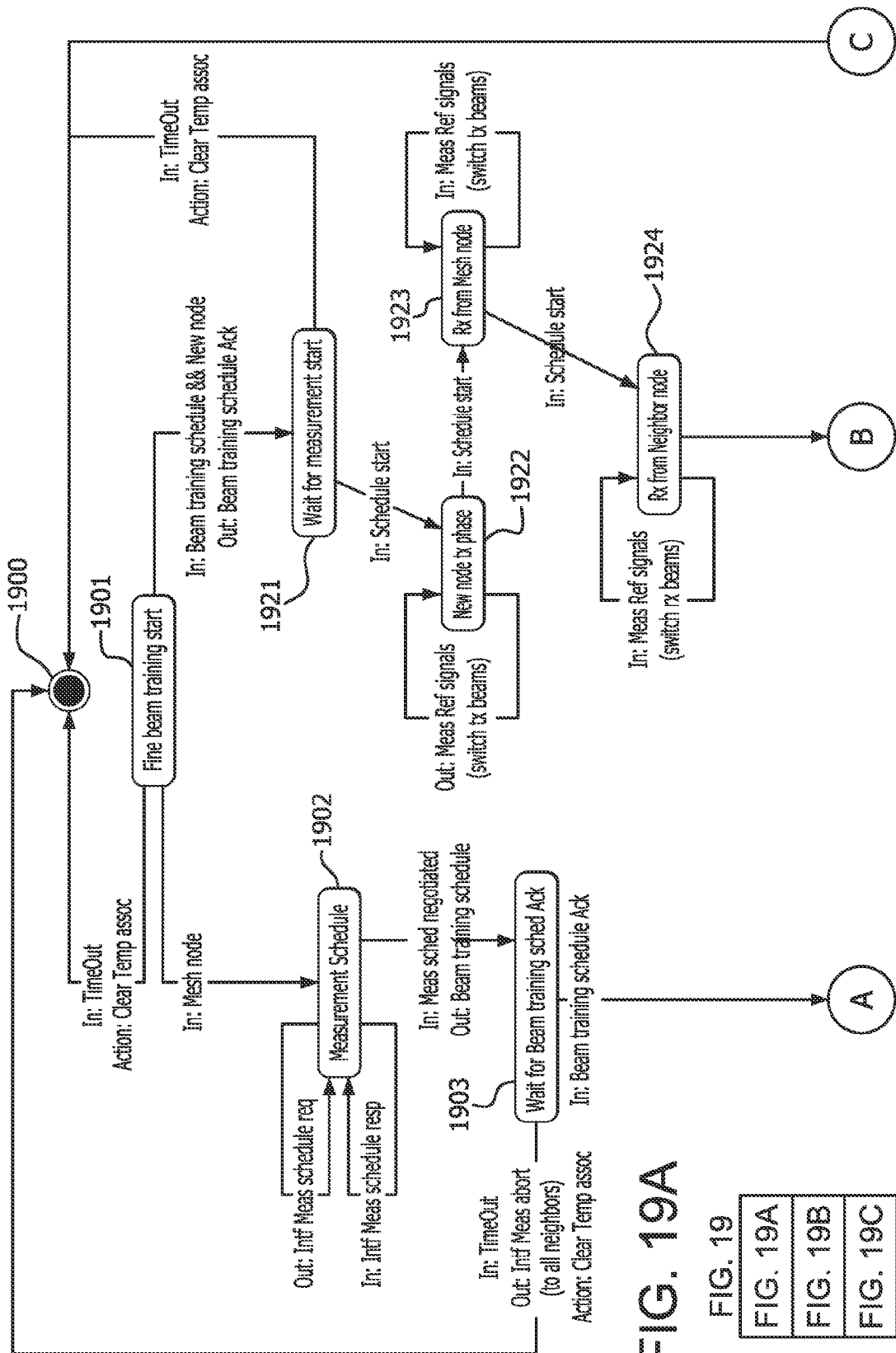
FIGS. 19A-19C show an example of an SINR-based beam selection procedure.
Figure 19B:
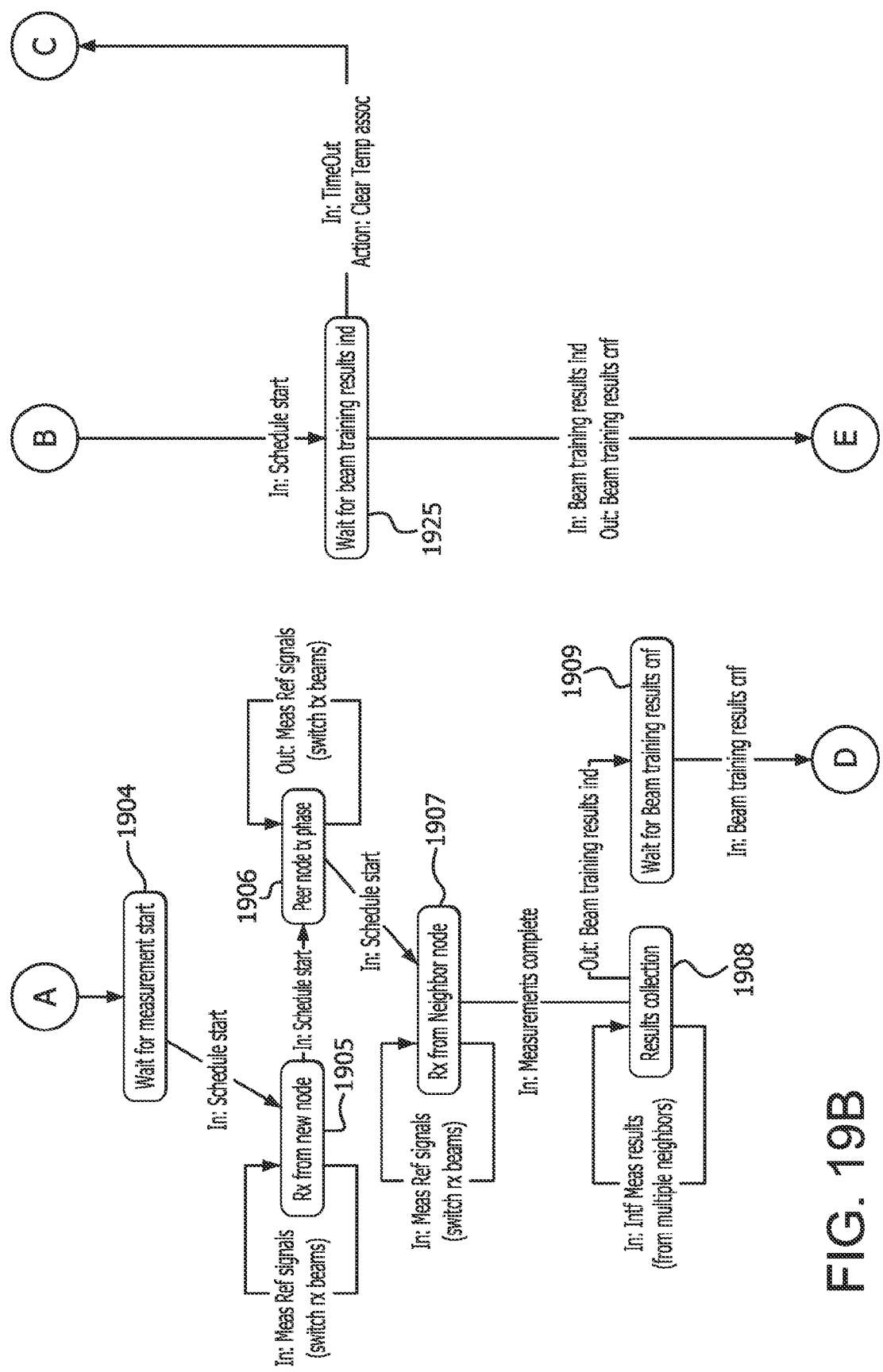
Figure 19C:
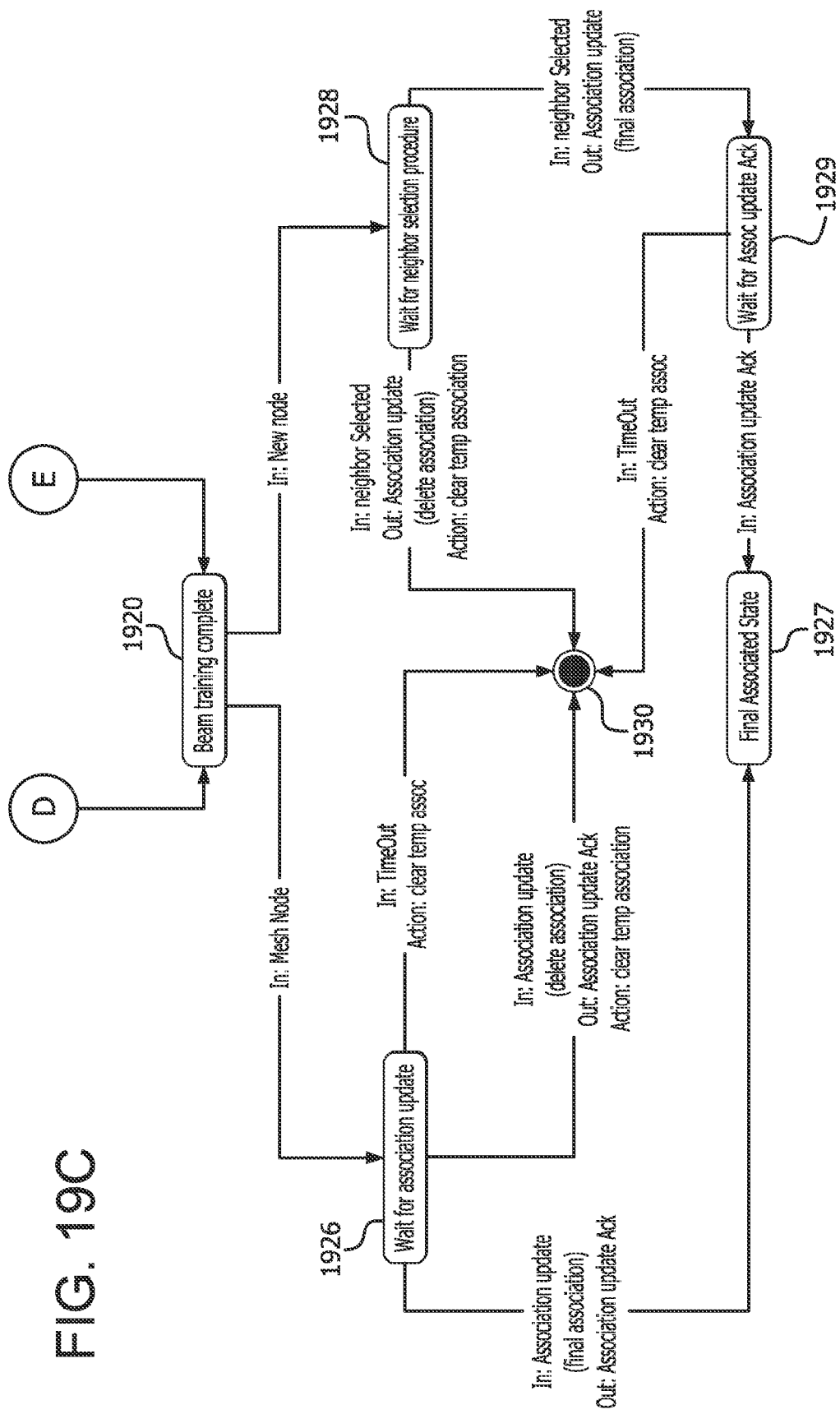

FIGS. 19A-19C show an example of a finite state machine view of a SINR-based beam selection procedure. At the start of fine beam training (1901) a mesh node may create a measurement schedule (1902). The mesh node may transmit an interference measurement schedule request and then create another measurement schedule (1902). The mesh node may receive an interference measurement schedule response and create another measurement schedule (1902). The mesh node may determine a negotiated measurement schedule and transmit a beam training schedule and wait for a beam training schedule ACK (1903). If the mesh node times out waiting for the beam training schedule ACK, it transmits an interference measurement abort message to all neighbor and temporary association ends (1900). If the mesh node receives a beam training schedule ACK, it may wait for a measurement start (1904). When the mesh node receives a schedule start, it may receive a reception from a new node (1905). The mesh node may receive measurement reference signals and then receive a reception from a new node (1905). The mesh node may receive another schedule start and receive a peer node tx phase (1906). The mesh node may transmit measurement reference signals and then receive a peer node tx phase (1906). The mesh node may receive another schedule start and receive a reception from a neighbor node (1907). The mesh node may receive measurement reference signals and then receive a reception from a neighbor node (1907). The mesh node may receive a measurements complete message and collect results (1908). The mesh node may receive interference measurement results from multiple neighbor nodes and then collect results (1908) again. The mesh node may transmit beam training results ind and wait for beam training results cnf (1909). The mesh node may transmit the beam training results cnf; beam training is complete (1920).

A new node may receive a beam training schedule and transmit a beam training schedule ACK and wait for a measurement start (1921). If the new node times out waiting for the measurement start, temporary association ends (1900). If the new node receives a schedule start, it receives a new node tx phase (1922). The new node may transmit measurement reference signals and then receive a new node tx phase (1922). The new node may receive another schedule start and receive a reception form the mesh node (1923).

The new node may receive measurement reference signals and then receive a reception from the mesh node (1923). The new node may receive another schedule start and receive a reception from a neighbor node (1924). The new node may receive measurement reference signals and then receive a reception from a neighbor node (1924). The new node may receive another schedule start and then wait for beam training results ind (1925). If the new node times out while waiting for the beaming training results ind, temporary association ends (1900). If the new node receives beam training results ind, it may transit beam training results cnf; beam training is complete (1920).

After beaming training is complete (1920), the mesh node may wait for an association update. If the mesh node times out while waiting for an association update, temporary association ends (1930). If the mesh node receive an association update, it may transmit an association update ACK and final association is achieved (1927). After beam training is complete (1920), the new node may wait for a neighbor selection procedure (1928). If the new node receives a selected neighbor and transmits an association update to delete association, temporary association ends (1930). If the new node receives a selected neighbor and transmits an association update, it may wait for an association update ACK (1928). If the new node times out while waiting for an association update ACK, temporary association ends (1930). If the new node receives an association update ACK, final association is achieved (1927).

A SINR based beam selection procedure may refer to the mechanism used by a new node to choose transmit and receive beams towards all of its neighbor peer mesh nodes. The new node may consider not only the signal power, but also the interference power to choose the best beams. The interference may have two components. A first component is the interference caused by mesh nodes on the new link and a second component is the interference caused by new link on the existing mesh nodes.

For each mesh node in the neighbor list, the new node may choose its TxBid (and the peer node's RxBid) such that it may maximize:

$$PT = \frac{S}{I_z + 1} \forall \, TxBid, RxBid. \quad \text{Equation (1)}$$

The new node may also choose its RxBid (and the peer node's TxBid) such that it may maximize:

$$PR = \frac{S}{I_z + 1} \forall \, TxBid, RxBid. \quad \text{Equation (2)}$$

S is the received signal power at the intended receiver due to the transmission from the intended transmitter. This may be a function of a receive beam ID used at the receiver and the transmit beam ID used at the transmitter, whereby:

$$S = \text{Meas\_Table}(TxNid, TxBid, RxNid, RxBid, 0); \quad \text{Equation (3)}$$

where TxNid is the node ID of the transmitter (new node or peer node), TxBid is the transmit beam ID used by the transmitter (new node or peer node), RxNid is the node ID of the intended receiver (peer node or mesh node), RxBid is the receive beam ID used by the receiver (peer node or mesh node), Tslot field is 0 or not applicable, if during beam training phase only one slot per TxBid-RxBid pair was used for measurement.

IZ is the average interference received at all of the nodes in the interference zone (only the interference power that is above the threshold is considered), where:

$$IZ = \frac{1}{N} \sum_{n=0}^{N-1} \left( \frac{1}{R} \sum_{r=0}^{R-1} \text{Meas\_Table}(TxNid, TxBid, n, r, Tslot) \right); \quad \text{Equation (4)}$$

where TxNid is the node ID of the transmitter (new node or peer node), TxBid is the transmit beam ID of the transmitter node (new node or peer node), N is the number of nodes in the interference zone, R is the number of receive beams used by each node (only towards the existing links/neighbors) in the interference zone, Tslot has a one to one mapping to the receive beam ID. If during the interference measurement phase only one slot per TxBid-RxBid pair may be used for measurement, I is the average interference power received by the mesh node (new node or peer node) due to transmissions from all of the nodes in the interference zone.

$$I = \frac{1}{N} \sum_{n=0}^{N-1} \left( \frac{1}{T} \sum_{t=0}^{T-1} \text{Meas\_Table}(n, t, RxNid, RxBid, Tslot) \right); \quad \text{Equation (5)}$$

where RxNid is the node ID of the receiver (new node or peer node), RxBid is the receive beam ID of the receiver node (new node or peer node), N is the number of nodes in the interference zone, T is the number of transmit beams used by each neighbor node (only towards the existing links/neighbors) in the interference zone, Tslot has a one to one mapping to the receive beam ID. If during the interference measurement phase only one slot per TxBid-RxBid pair may be used for measurement.

At the end of the beam selection procedure, a pair of beam IDs (TxBid and RxBid) and an associated P metric may be derived per neighbor link direction. Thus, the output of the SINR based beam selection procedure may be a set of quadruplets (TxBid-RxBid, PT, RxBid-TxBid, PR) obtained for each neighbor link.

To improve the new node join time, the new node may optionally perform a background search for the neighbor node beacon during a BTI period in the sectors other than the sector chosen for the peer mesh node with which any of the procedures, for example, temporary association/registration/beam training, may be ongoing. In addition, the peer mesh node or OAM center may also provide the neighbor assistance information (number of possible neighbor nodes, approximate direction of the neighbor node, slot timing information, and the like). The new node may use this assistance information while scanning for other neighbors.

The new node may now repeat the whole temporary association, fine beam training and SINR based beam selection process sequentially with all other discovered neighbors. The process may be similar to the one discussed previously, except that the registration procedure may be performed only once (with the first peer mesh node).

After the completion of fine beam training, the new node may obtain the information necessary to perform neighbor filtering. The new node may choose the neighbors taking into account at least the following factors: SNR of preferred beams, interference seen by neighboring nodes, and path metric to the gateway. The new node may choose a best beam towards each of its neighbors that causes the least interference to others that may result in the best path metric to the gateway.

After the new node chooses a preferred Tx/Rx beam ID towards all of the discovered neighbors, the neighbor filtering procedure may be performed. The nodes may be restricted to have a minimum of two (2) and a maximum of N neighbors, where N may be configured by the gateway/OAM with the parameter node connectivity limit in temporary association/registration response messages. This restriction may ensure that the control regions are kept relatively short to achieve better MAC efficiency, and at the same time allowing for some path diversity and reliability in case of link failures. Thus, the new node may choose the top (<N) candidates as the neighbors and filter out those remaining.

A neighbor selection procedure may have two steps: a neighbor filtering step followed by a control slot selection step. An input to the neighbor filtering procedure may include the list of nodes that the new node discovered and performed a fine beam training procedure. This list of discovered nodes may be referred to as a candidate list. If the candidate list is empty, then the new node may display a local alarm (for example, via a light emitting diode (LED) or any other display). The non-empty candidate list may be filtered based on neighbor filtering criteria. Neighbor filtering criteria may put a lower limit on the PT, PR, path metric and load metric for each selected neighbor. As a result of the neighbor filtering procedure, the candidate list may be split into three sets: a preferred list (candidates with no interference), an acceptable list (candidates with interference, but passed the neighbor filtering criteria), and a forbidden list (nodes that did not pass the neighbor filtering criteria, or the neighbors that transmitted temporary association reject; the forbidden list may be maintained to re-search later if the new node provides better service to a node in barred list).

In addition to above mentioned lists, a collision list for each control slot may be created. A collision list for a control slot may be defined as the list of nodes in the interference zone of the new node that are active in that control slot.

Inputs to the control slot selection procedure may include the preferred list, acceptable list, and the collision list for each control slot. The control slot selection procedure may choose a dedicated control slot for each of the selected neighbor nodes. The control slots may be chosen such that the control slot is not already being used by the peer mesh node (the node towards which the control slot may be used), and potential interfering nodes identified during interference training may not use the same control slot in the same interfering direction. If such a control slot cannot be found, then the new node may either chose another beam for this peer node, prefer a next neighbor, or drop the control slot. In one option, there may be separate beams for control and data slots. By the end of this process, the new node may have a list of neighbors and the control slots for each of the chosen neighbors.

A pseudo code/algorithm for control slot selection is outlined below.

First, the following algorithm may be run for a preferred list and then, if any of the control slots are free or a certain throughput threshold (calculate using SINR and path metric) is not met, then the algorithm may be run again for an acceptable list.

Second, for each free control slot, all of the free nodes from a candidate list may be added to form an overlapping list for this particular control slot. Each control slot may have its own overlapping list. If the size of the current overlapping list is zero (0), the algorithm may skip to the next control slot. While the size of any overlapping list is one (1), the algorithm may start from a current control slot.

The node in the overlapping list may be designated as $O_n$. All of the nodes in the interference zone that are active in the current control slot may be added to a collision list. Each control slot may have its own collision list. The collision metric may be calculated as follows:

$$C = \frac{1}{2}(C_T + C_R); \qquad \text{Equation (6)}$$

where $C_T=P_T$, with the following parameters: N as number of nodes in collision list, TxNid as the node ID of the new node, TxBid as the transmit beam ID chosen for new node, RxNid as the node ID of the node $O_n$, RxBid as the receive beam ID chosen for the node $O_n$, Tslot as the part of control slot when new node is transmitting. Or where $C_R=P$, with the following parameters: N as number of nodes in collision list, TxNid as the node ID of the node $O_n$, TxBid as the transmit beam ID chosen for node $O_n$, RxNid as the node ID of the new node, RxBid as the receive beam ID chosen for the new node, Tslot as the part of control slot when node $O_n$ is transmitting.

Two possible values $C_1$ and $C_2$ may exist for C metric. $C_1$ is when a new node transmits first in the control slot and $C_2$ is when node $O_n$ transmits first in the control slot. The slot timing may be chosen so that it results in max($C_1$, C2) and denotes it as C. If the same node $O_n$ is present in any overlapping list (for any other control slot) and the size of that overlapping list is also 1, then the slot with the highest C metric may be chosen.

If the metric C is $>C_{threshold}$, node $O_n$ may be assigned to the corresponding control slot, node $O_n$ may be removed from the candidate list, node $O_n$ may be removed from the overlapping list of all control slots, and if the number of control slots that contain assigned neighbors is N, then at the end, each control slot may have the mesh peer assigned and the candidate list may have the list of neighbors that are not assigned a control slot. In case the new node is not able to find the required number of neighbors/control slots, the new node may choose the best candidate node and transmit a fault report to the OAM center. The fault report may carry the candidate list, C metric, path metric, load metric of each of the candidate.

If the metric C is not $>C_{threshold}$, $O_n$ may be removed from the overlapping list of current control slot and this control slot may be marked as being empty. While any of overlapping list size is >1, an overlapping list may not have size 1.

In a first example, among all of the nodes in current overlapping list (for a particular control slot), the top two nodes (n1,n2) with highest C metric may be chosen. The C metric difference between the top two nodes may be diff_C. If the node n1 tops in any other overlapping list, then the diff_C of all those lists may be determined. The overlapping list whose diff_C is highest may be selected and the other nodes may be removed from the selected overlapping list, so that only node n1 may remain. While the size of any overlapping list is 1, if the metric C is $>C_{threshold}$, node $O_n$ may be assigned to the corresponding control slot, node $O_n$ may be removed from the candidate list, node $O_n$ may be removed from the overlapping list of all control slots, and if the number of control slots that contain assigned neighbors is N then at the end, each control slot may have the mesh peer assigned and the candidate list may have a list of neighbors that are not assigned a control slot. In case the new node is not able to find the required number of neighbors/control slots, the new node may choose the best candidate node and transmit a fault report to the OAM center. The fault report may carry the candidate list, C metric, path metric, load metric of each of the candidate. Otherwise, $O_n$ may be removed from the overlapping list of current control slots and this control slot may be marked as being empty.

In a second example, the first example may apply, but instead of a C metric, a path metric may be used (or combination of path metric and C metric) for nodes in an overlapping list.

In a third example, among the nodes in the overlapping list, the node that has largest angular separation from the nodes selected in each control slot may be chosen. This option may provide better spatial diversity. At the end, each control slot will have the mesh peer assigned and the candidate list will have list of neighbors that are not assigned a control slot.

Figure 20C:
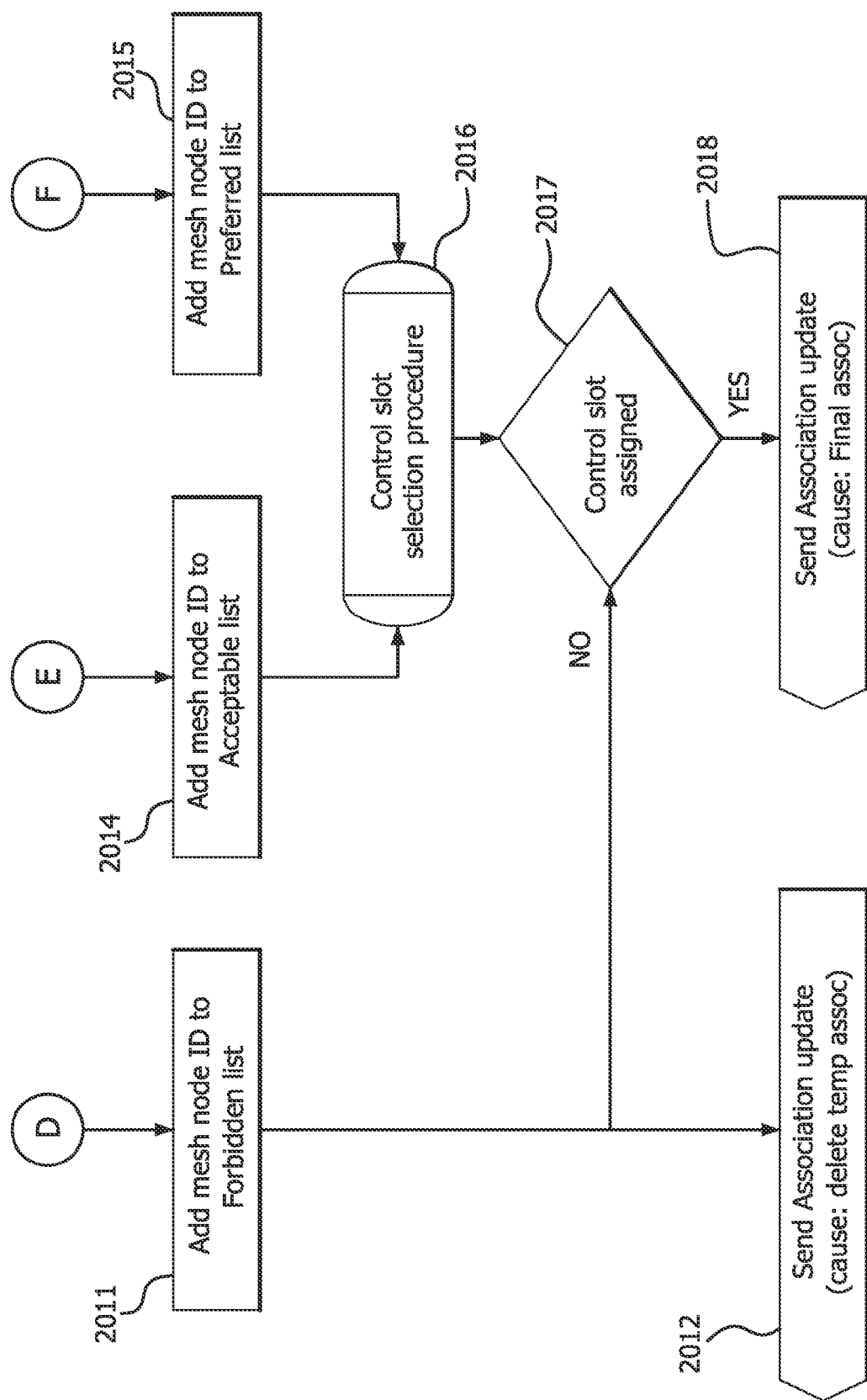

FIGS. 20A-20C show an example of a neighbor selection and final association procedure. FIGS. 20A-20C illustrate the interworking between neighbor filtering, control slot selection, and the final association procedure. The neighbor selection and final association procedure may begin with boot-up and initialization (2001) and a discovery procedure (2002). The new node may search for a neighbor (2003). If no neighbor is found, the new node may determine if all sectors are complete (2008). If a neighbor is found, the new node may perform temporary association (2004) with the neighbor node. The new node may then perform beam training (2005) with the neighbor node. The new node may then perform an SINR based beam selection procedure (2006) and add the neighbor node a candidate list (2007). Once the neighbor node is added to the candidate list, the new node may determine if all sectors are complete (2008). If not all sectors are complete the new node may return to the discovery procedure (2002). If all sectors are complete, the new node may, for all nodes in the candidate list (2009), determine neighbor filtering criteria (2010). If the neighbor filtering criteria fails, the mesh node ID is added to a forbidden list (2011). The new node then transmits an association update (2012), resulting in a deletion of the temporary association. If the neighbor filtering criteria passes, the new node may determine if interference causes are linked to the mesh node (2013). If the interference causes are linked to the mesh node, the mesh node ID may be added to an acceptable list (2014) and a control slot selection procedure may begin (2016). If the interference causes are not linked to the mesh node, the mesh node ID may be added to a preferred list (2015) and a control slot selection procedure may begin (2016). The new node may determine if a control slot is assigned (2017). If a control slot is assigned, the new node may transmit an association update, resulting in a final association (2018). If a control slot is not assigned, the new node may transmit an association update (2012), resulting in a deletion of the temporary association.

After the neighbor filtering and control slot selection, the final association may be implemented. The new node may perform a final association procedure with each of the selected nodes in the control slot selection procedure. The association update request message with the cause value set to final association may be used to perform the final association procedure. The association update request message may carry, among other information, the control slot to use, transmit/receive beam to use, and the like. In addition to the final association procedure, the new node may also inform the neighbors that are not selected via an association update request with the cause value as delete association. The association update message may also trigger the mesh nodes to release the reservation on the BRI period, so that any other new node may now join the network.

FIG. 21 shows an example of a final association procedure. Peer node 1 2101 may perform temporary association registration and fine beam training (2104) with a new node 2102. The new node 2102 may perform temporary association and fine beam training (2105) with peer node 2 2103. The new node 2102 may perform neighbor selection (2106). The neighbor selection may be achieved using SINR based beam selection and control slot selection. In a final association (2111), the new node 2102 may transmit an association update (2107) to peer node 1 2101. Peer node 1 2101 may transmit an association update ACK (2108) to the new node 2102. The new node 2102 may transmit an association update, to delete association, (2109) to peer node 2 2103. Peer node 2 2103 may transmit an association update ACK (2110) to the new node 2102.

Once the final association procedure is complete, the new node and all of its neighbors may switch to the fine beam in the chosen control slot. During the final association process, the new node may inform the potential interferers to the primary/neighbor node. Thus, the new node and the interferers may agree on the interference management mechanism. The interference management may be either localized or coordinated. Some of the localized mechanisms may be power control, MCS change, time/frequency multiplexing (reserving specific parts of data region), randomization of data scheduling or dropping the link altogether. Some examples of coordinated mechanisms may include TTI-based time multiplexing or frequency multiplexing. The coordinated approach may involve explicit signaling exchange between a new node and interfering nodes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for association for a node in a mesh network, the method comprising:
    performing a discovery procedure with a plurality of peer nodes in the mesh network;
    initiating a temporary association procedure with each peer node;
    selecting a set of the peer nodes from the plurality of peer nodes based on a selection algorithm at least based on a signal-to-interference and noise ratio (SINR) with each peer node and an interference impact of each peer node; and
    performing a final association with the selected set of peer nodes.

2. The method of claim 1, wherein the temporary association procedure reserves resources during a beacon response interval (BRI) to allow the node to communication with each peer node.

3. The method of claim 2, wherein reservation of the BRI prevents collision.

4. The method of claim 1, wherein the temporary association procedure creates temporary context of the node in each peer node.

5. The method of claim 4, wherein the node registers with an operation, administration, and maintenance (OAM) center using each peer node on a condition that a peer node is a primary node.

6. The method of claim 4, wherein the node performs an authentication procedure using each peer node.

7. The method of claim 4, wherein the node performs SINR-based beam forming with each peer node.

8. The method of claim 1, wherein the selection algorithm takes into account a signal-to-interference and noise ratio (SINR) of each peer node link, a load on each peer node, a path metric to a gateway, and control slot availability.

9. The method of claim 1, wherein temporary association with each peer node that is not selected during selection is deleted.

10. The method of claim 1 further comprising receiving a beacon response acknowledgement from the set of peer nodes, wherein the beacon response acknowledgement includes an offset for a next beacon response interval (BRI).

11. A node for association in a mesh network comprising:
an antenna;
a processor, coupled to the antenna, configured to perform a discovery procedure with a plurality of peer nodes in the mesh network;
the processor further configured to initiate a temporary association procedure with each peer node;
the processor further configured to select a set of the peer nodes from the plurality of peer nodes based on a selection algorithm at least based on a signal-to-interference and noise ratio (SINR) with the each peer node and an interference impact of each peer node; and
the processor further configure to perform final association with the selected set of the peer nodes.

12. The node of claim 11, wherein the temporary association procedure reserves resources during a beacon response interval (BRI) to allow the new node to communication with each peer node.

13. The node of claim 12, wherein reservation of the BRI prevents collision.

14. The node of claim 11, wherein the temporary association procedure creates temporary context of the new node in each peer node.

15. The node of claim 14, wherein the new node registers with an operation, administration, and maintenance (OAM) center using each peer node on a condition that a peer node is a primary node.

16. The node of claim 14, wherein the new node performs an authentication procedure using each peer node.

17. The node of claim 14, wherein the new node performs SINR-based beam forming with each peer node.

18. The node of claim 11, wherein the selection algorithm takes into account a signal-to-interference and noise ratio (SINR) of each peer node link, a load on each peer node, a path metric to a gateway, and control slot availability.

19. The node of claim 11, wherein temporary association with each peer node that is not selected during selection is deleted.

20. The node of claim 11, wherein the antenna is further configured to receiving a beacon response acknowledgement from the set of peer nodes includes an offset for a next beacon response interval (BRI).

* * * * *